United States Patent
Kim et al.

(10) Patent No.: US 12,156,115 B2
(45) Date of Patent: Nov. 26, 2024

(54) ELECTRONIC DEVICE AND METHOD FOR PERFORMING RANGING OPERATION

(71) Applicant: SAMSUNG ELECTRONICS CO., LTD., Suwon-si (KR)

(72) Inventors: Hyunchul Kim, Suwon-si (KR); Moonseok Kang, Suwon-si (KR); Yi Yang, Suwon-si (KR); Sejong Yoon, Suwon-si (KR); Mingyu Lee, Suwon-si (KR); Jonghoon Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 17/828,657

(22) Filed: May 31, 2022

(65) Prior Publication Data

US 2022/0386214 A1  Dec. 1, 2022

Related U.S. Application Data

(63) Continuation of application No. PCT/KR2022/006145, filed on Apr. 29, 2022.

(30) Foreign Application Priority Data

Jun. 1, 2021  (KR) .................. 10-2021-0070751

(51) Int. Cl.
H04W 4/02  (2018.01)
H04W 40/02  (2009.01)
(Continued)

(52) U.S. Cl.
CPC ......... *H04W 40/026* (2013.01); *H04W 40/12* (2013.01); *H04W 40/24* (2013.01)

(58) Field of Classification Search
CPC ............ G01S 13/02; G01S 13/76; G01S 5/10; H04W 40/026; H04W 40/12; H04W 40/24
See application file for complete search history.

(56) References Cited

U.S. PATENT DOCUMENTS 10,652,925 B2  5/2020  Naguib et al.
2005/0192031 A1  9/2005  Vare
(Continued)

FOREIGN PATENT DOCUMENTS

CN  118251613 A  *  6/2024
EP  2693661 B1  *  9/2017  ........... H04L 5/0035
(Continued)

OTHER PUBLICATIONS

International Search Report dated Feb. 21, 2022 issued by the International Searching Authority in International Application No. PCT/KR2021/016409 (PCT/ISA/210).
(Continued)

*Primary Examiner* — Phuc H Tran
(74) *Attorney, Agent, or Firm* — Sughrue Mion, PLLC

(57) ABSTRACT

According to various embodiments, an electronic device may include a communication circuit; and at least one processor operatively connected to the communication circuit, wherein the at least one processor is configured to: receive, via the communication circuit from at least one external electronic device in a first active ranging round within a first ranging block, a ranging response message (RRM) including a first round index of a first ranging round in which the at least one external electronic device performs a first ranging operation as an initiator in a neighbor cell, and a number of hops between a reference cell in which a reference external electronic device exists and the neighbor cell, and select a second active ranging round in which the electronic device performs a second ranging operation in a second ranging block based on at least the RRM.

20 Claims, 14 Drawing Sheets

(51) Int. Cl.
  *H04W 40/12* (2009.01)
  *H04W 40/24* (2009.01)

(56) References Cited

U.S. PATENT DOCUMENTS

| | | | |
|---|---|---|---|
| 2008/0080640 | A1 | 4/2008 | Rofougaran |
| 2010/0002612 | A1 | 1/2010 | Hsu et al. |
| 2011/0292819 | A1 | 12/2011 | Ekbal et al. |
| 2015/0168536 | A1 | 6/2015 | Banin et al. |
| 2019/0007093 | A1 | 1/2019 | Hammerschmidt et al. |
| 2019/0246300 | A1* | 8/2019 | Ko .................. H04W 28/0215 |
| 2020/0100283 | A1 | 3/2020 | Naguib et al. |
| 2020/0106877 | A1 | 4/2020 | Ledvina et al. |
| 2020/0137676 | A1 | 4/2020 | Yoon et al. |
| 2020/0366335 | A1 | 11/2020 | Lee et al. |
| 2021/0014844 | A1 | 1/2021 | Lee et al. |
| 2021/0076163 | A1 | 3/2021 | Burowski et al. |
| 2021/0105736 | A1 | 4/2021 | Tancerel et al. |
| 2021/0148844 | A1 | 5/2021 | Turnbull et al. |
| 2023/0188930 | A1* | 6/2023 | Knott .................. H04W 4/023 455/1 |

FOREIGN PATENT DOCUMENTS

| | | |
|---|---|---|
| KR | 10-2006-0019007 A | 3/2006 |
| KR | 10-2013-0040939 A | 4/2013 |
| KR | 10-2018-0026737 A | 3/2018 |
| KR | 10-2018-0135947 A | 12/2018 |
| KR | 10-2019-0004240 A | 1/2019 |
| KR | 10-2019-0007206 A | 1/2019 |
| KR | 10-2055085 B1 | 12/2019 |
| KR | 10-2020-0035205 A | 4/2020 |
| KR | 10-2021-0007831 A | 1/2021 |
| WO | 2017196584 A1 | 11/2017 |
| WO | 2020/116969 A1 | 6/2020 |
| WO | 2020/230993 A1 | 11/2020 |
| WO | 2021/085825 A1 | 5/2021 |

OTHER PUBLICATIONS

Written Opinion dated Feb. 21, 2022 issued by the International Searching Authority in International Application No. PCT/KR2021/016409 (PCT/ISA/237).
"3rd Generation Partnership Project; Technical Specification Group Services and System Aspects; Study on Ranging-based Services (Release 18)", 3GPP TR 22.855 V1.0.0, 3rd Generation Partnership Project (3GPP), Mar. 2021, 54 pages total.
International Search Report (PCT/ISA/210) dated Aug. 12, 2022, issued by the International Searching Authority in counterpart International Application No. PCT/KR2022/006145.
Written Opinion (PCT/ISA/237) dated Aug. 12, 2022, issued by the International Searching Authority in counterpart International Application No. PCT/KR2022/006145.
Macoir et al., "MAC Protocol for Supporting Multiple Roaming Users in Multi-Cell UWB Localization Networks," 2018 IEEE 19th International Symposium on "A World of Wireless, Mobile and Multimedia Networks" (Wowmom); IEEE, Jun. 12, 2018, pp. 588-599, XP033394352, DOI: 10.1109/WOWMOM.2018.8449815.
Communication issued on Aug. 28, 2024 by the European Patent Office in European Application No. 22816308.5.

* cited by examiner

ELECTRONIC DEVICE AND METHOD FOR PERFORMING RANGING OPERATION

CROSS-REFERENCE TO RELATED APPLICATIONS

This application is a bypass continuation application of International Application No. PCT/KR2022/006145, which was filed on Apr. 29, 2022, and is based on and claims priority to Korean Patent Application No. 10-2021-0070751, which was filed in the Korean Intellectual Property Office on Jun. 1, 2021, the disclosures of which are incorporated by reference herein in their entireties.

Additionally, this application is related to Korean Patent Application No. 10-2021-0071157, filed on Jun. 1, 2021 in the Korean Intellectual Property Office, the disclosure of which is incorporated by reference herein in its entirety.

BACKGROUND

1. Field

The present disclosure relates generally to wireless communication systems, and more particularly, to electronic devices and methods for performing ranging operations.

2. Description of Related Art

Recently, with the development of information communication technology, various wireless communication technologies and various services have been developed. In particular, a ultra wide band (UWB) technology is a communication technology which may transmit and receive signals using very short pulses (e.g., several nanoseconds) with low power over a wide band. In the past, UWB technology has been used for military purposes, such as a military radar and remote sensing, but the U.S. Federal Communications Commission (FCC) has licensed commercial use of UWB technology limited to an indoor wireless communication, so UWB technology has been used in various fields.

UWB technology has been spotlighted as a technology capable of recognizing and tracking a precise location of an electronic device in an internet of things (IoT) environment or a ubiquitous environment in the future. UWB technology may be used in the various fields such as indoor and outdoor location tracking, indoor navigation, asset tracking, disaster-related industrial robots, home and building automation, car and home smart key services, or unmanned payment systems.

In a UWB technology, a downlink (DL) time difference of arrival (TDoA) scheme may be a scheme in which an electronic device (e.g., a mobile device) may receive UWB messages transmitted by external electronic devices (e.g., anchors) whose locations are fixed to detect a location of the electronic device. For example, the electronic device may detect the location of the electronic device by overhearing the UWB messages transmitted by the external electronic devices.

In the DL TDoA scheme, the electronic device may need to wait in order to receive UWB messages while a reception (RX) chain is always in an on-state. A case that the electronic device waits in order to receive the UWB messages while the RX chain is continuously in the on-state may cause unnecessary current consumption, and, as such, may shorten use time of the electronic device.

Currently, in the DL TDoA scheme, a scheme in which the electronic device may know which neighbor cells use certain ranging rounds may not be provided; thus, a scheme of determining which neighbor cell is suitable for the electronic device among the neighbor cells in a case that the electronic device moves is not provided.

SUMMARY

According to an aspect of the disclosure, there is provided an electronic including: a communication circuit; and at least one processor operatively connected to the communication circuit, wherein the at least one processor is configured to: receive, via the communication circuit from at least one external electronic device in a first active ranging round within a first ranging block, a ranging response message (RRM) including a first round index of a first ranging round in which the at least one external electronic device performs a first ranging operation as an initiator in a neighbor cell, and a number of hops between a reference cell in which a reference external electronic device exists and the neighbor cell, and select a second active ranging round in which the electronic device performs a second ranging operation in a second ranging block based on at least the RRM.

According to an aspect of the disclosure, an electronic device includes: a communication circuit; and at least one processor operatively connected to the communication circuit, wherein the at least one processor is configured to: generate a ranging response message (RRM) including a neighbor initiator round index field indicating a first round index of a first ranging round in which the electronic device performs a first ranging operation as an initiator in a neighbor cell, and a neighbor initiator cost metric field indicating a number of hops between a reference cell in which a reference external electronic device exists and the neighbor cell, and transmit, via the communication circuit, the RRM in at least one second ranging round within a first ranging block.

According to an aspect of the disclosure, a method performed by an electronic device includes: receiving, from at least one external electronic device in a first active ranging round within a first ranging block, a ranging response message (RRM) including a first round index of a first ranging round in which the at least one external electronic device performs a first ranging operation as an initiator in a neighbor cell, and a number of hops between a reference cell in which a reference external electronic device exists and the neighbor cell; and selecting a second active ranging round in which the electronic device performs a second ranging operation in a second ranging block at least based on the RRM.

DETAILED DESCRIPTION

Figure 1:
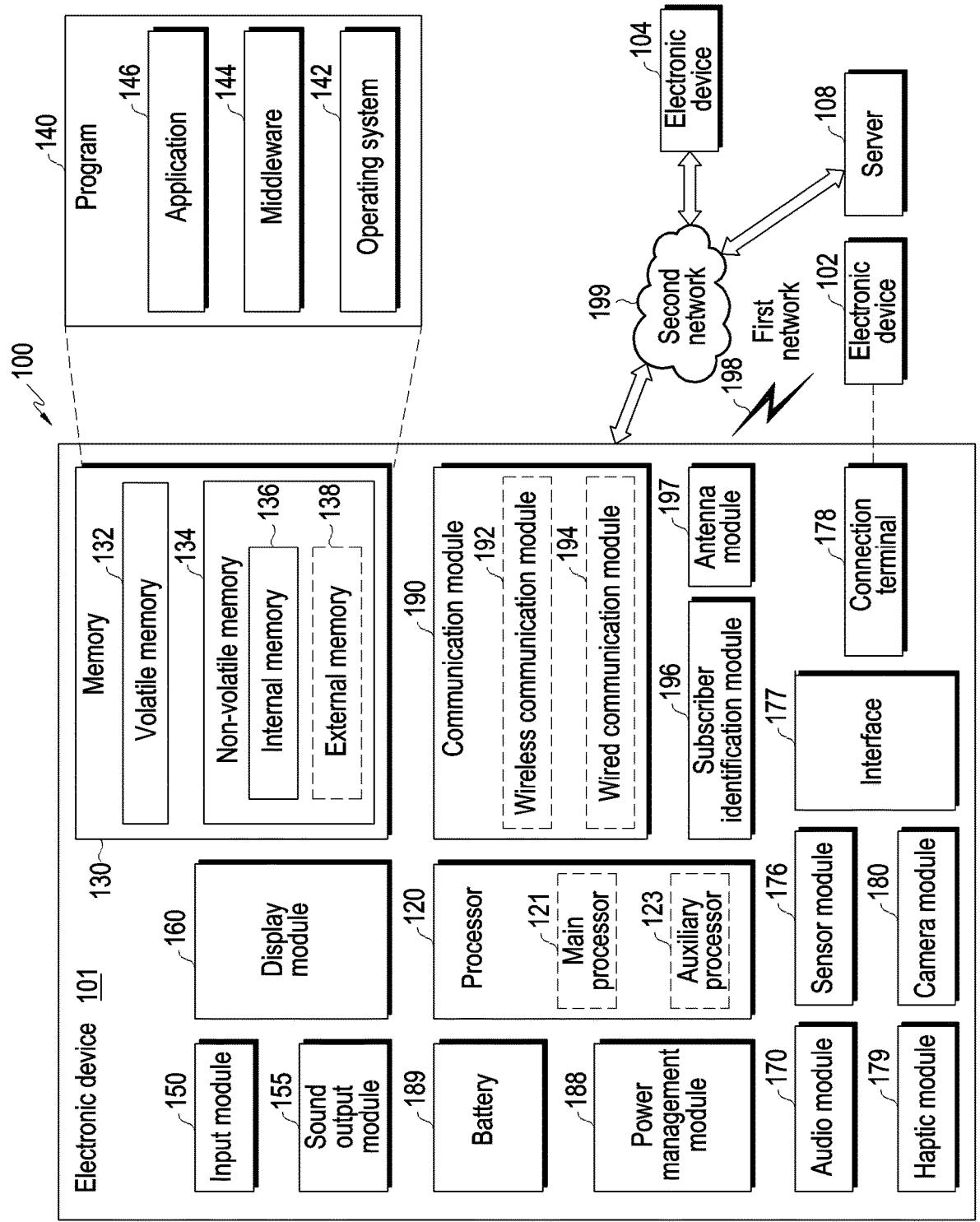
FIG. 1 is a block diagram illustrating an electronic device within a network environment according to various embodiments.

Hereinafter, various embodiments of the disclosure will be described in detail with reference to the accompanying drawings. In the following description of various embodiments of the disclosure, a detailed description of relevant known functions or configurations incorporated herein will be omitted when it is determined that the description may make the subject matter of various embodiments of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include" should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described in detail with reference to the accompanying drawings. Regardless of drawing signs, the same or like elements are provided with the same reference numeral, and a repeated description thereof will be omitted. Alternatively, in describing various embodiments of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, an electronic device will be described in various embodiments of the disclosure, but the an electronic device may be also referred to as a terminal, a mobile station, a mobile equipment (ME), a user equipment (UE), a user terminal (UT), a subscriber station (SS), a wireless device, a handheld device, and an access terminal (AT). Alternatively, in various embodiments of the disclosure, the terminal may be a device having a communication function such as, for example, a mobile phone, a personal digital assistant (PDA), a smart phone, a wireless modulator/demodulator (MODEM), and a notebook.

In a detailed description of various embodiments of the disclosure, a ultra wide band (UWB) standard which may be specified by Institute of Electrical and Electronics Engineers: IEEE) 802.15.4/4z or a FiRa (FiRa Consortium) standard which may be specified by FiRa which is a consortium which is based on the UWB standard are referred to, but the main subject of the disclosure can be somewhat modified and applied to a communication system which uses other standards having a similar technical background without departing from the scope of the disclosure, and the modifications can be made on the basis of determination of those skilled in the art.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or two or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
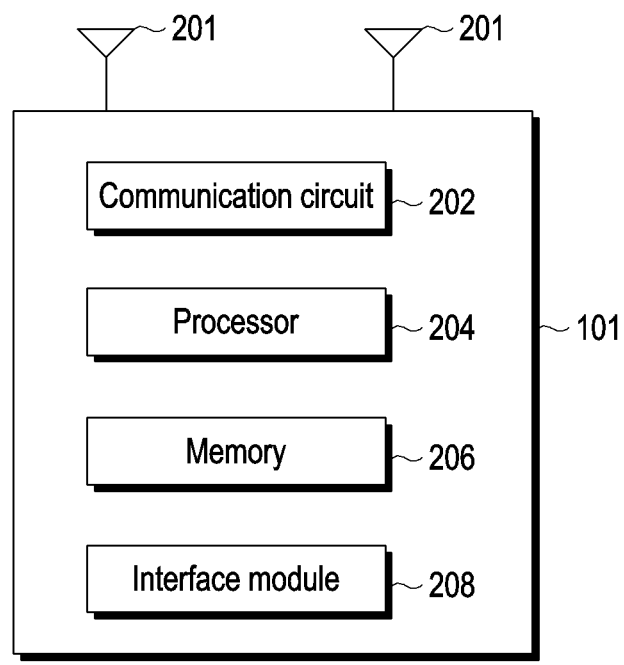
FIG. 2 is a block diagram of an electronic device according to various embodiments.

FIG. 2 is a block diagram of an electronic device 101 according to various embodiments.

Referring to FIG. 2, an electronic device (e.g., the electronic device 101 of FIG. 1) may be a device implementing a UWB scheme. The electronic device 101 may include a communication circuit 202 (e.g., a communication module 190 of FIG. 1) which transmits and receives signals with an external electronic device (e.g., the electronic device 102 or 104 of FIG. 1), for example, a peer device using one or more antennas 201.

The electronic device 101 may include a processor 204 (e.g., the processor 120 of FIG. 1) which may be implemented in one or more single-core processors or one or more multi-core processors, and a memory 206 (e.g., the memory 130 of FIG. 1) which stores instructions for an operation of the electronic device 101.

The electronic device 101 may include an interface module 208 (e.g., the interface 177 of FIG. 1) which provides a wired and/or wireless interface for communicating with components outside a network. At least a portion of the one or more antennas 201, the communication circuit 202, or the interface module 208 may be implemented as, for example, at least a portion of the communication module 190 and the antenna module 198 of FIG. 1.

According to an embodiment, the electronic device 101 may include a plurality of communication circuits, one of the plurality of communication circuits may be a communication circuit which is based on a UWB scheme, and another of the plurality of communication circuits may be a communication circuit which is based on a Bluetooth scheme, e.g., a Bluetooth low energy (BLE) scheme, which is one of short-range communication schemes. According to an embodiment, the plurality of communication circuits may include a communication circuit 202, and the communication circuit 202 may be a communication circuit which is based on the UWB scheme or a communication circuit which is based on the BLE scheme.

According to an embodiment, the electronic device 101 does not separately include a communication circuit which is based on the UWB scheme and a communication circuit which is based on the BLE scheme, and may include one communication circuit capable of supporting both the UWB scheme and the BLE scheme. For example, the communication circuit 202 may be one communication circuit capable of supporting both the UWB scheme and the BLE scheme.

According to various embodiments of the disclosure, an electronic device (e.g., the electronic device 101 of FIG. 1, a mobile device 301 of FIG. 3, or a mobile device 1001 of FIG. 10) may include a communication circuit 202, and at least one processor 204 operatively connected to the communication circuit 202, and the at least one processor 204 may be configured to: receive, via the communication circuit 202 from at least one external electronic device (e.g., a second anchor 311-2 to an Nth anchor 311-N of FIG. 3, or a first slave anchor 1005-1 to an Nth slave anchor 1005-N of FIG. 10) in an active ranging round within a first ranging block, a ranging response message (RRM) including a round index of a ranging round in which the at least one external electronic device (e.g., the second anchor 311-2 to the Nth anchor 311-N of FIG. 3, or the first slave anchor 1005-1 to the Nth slave anchor 1005-N of FIG. 10) performs a ranging operation as an initiator in a neighbor cell, and a number of hops between a reference cell in which a reference external electronic device exists and the neighbor cell, and select an active ranging round in which the electronic device (e.g., the electronic device 101 of FIG. 1, the mobile device 301 of FIG. 3, or the mobile device 1001 of FIG. 10) will perform a ranging operation in a second ranging block based on at least the RRM.

According to various embodiments of the disclosure, the RRM may further include a round index of a ranging round in which the at least one external electronic device (e.g., the second anchor 311-2 to the Nth anchor 311-N of FIG. 3, or the first slave anchor 1005-1 to the Nth slave anchor 1005-N of FIG. 10) performs a ranging operation as a responder in at least one other neighbor cell.

According to various embodiments of the disclosure, the at least one processor 204 may be configured to check whether detection of a location of the electronic device (e.g., the electronic device 101 of FIG. 1, the mobile device 301 of FIG. 3, or the mobile device 1001 of FIG. 10) is successful in the active ranging round within the first ranging block. The at least one processor 204 may be configured to, if the detection of the location of the electronic device (e.g., the electronic device 101 of FIG. 1, the mobile device 301 of FIG. 3, or the mobile device 1001 of FIG. 10) is successful, select a first cell which is one of a serving cell and the neighbor cell based on the RRM received from the at least one external electronic device (e.g., the second anchor 311-2 to the Nth anchor 311-N of FIG. 3, or the first slave anchor 1005-1 to the Nth slave anchor 1005-N of FIG. 10). The at least one processor 204 may be configured to select an active ranging round in the first cell as the active ranging round in the second ranging block.

According to various embodiments of the disclosure, the at least one processor 204 may be configured to select the first cell based on at least one of signal quality and path quality of the received RRM, a field of view (FoV) state and a line of sight (LoS) state of the at least one external electronic device (e.g., the second anchor 311-2 to the Nth anchor 311-N of FIG. 3, or the first slave anchor 1005-1 to the Nth slave anchor 1005-N of FIG. 10) related to the received RRM, or the number of hops between the reference cell and the neighbor cell included in the received RRM.

According to various embodiments of the disclosure, the at least one processor 204 may be further configured to select at least one additional ranging round in which a ranging operation is to be performed in the second ranging block if a state of the first cell is a state in which a set condition is satisfied.

According to various embodiments of the disclosure, the at least one processor 204 may be configured to check whether location information of the at least one external electronic device (e.g., the second anchor 311-2 to the Nth anchor 311-N of FIG. 3, or the first slave anchor 1005-1 to the Nth slave anchor 1005-N of FIG. 10) existing in the neighbor cell or at least one other external electronic device existing on a path on which the electronic device (e.g., the electronic device 101 of FIG. 1, the mobile device 301 of FIG. 3, or the mobile device 1001 of FIG. 10) will move is obtainable, and if the location information of the at least one external electronic device (e.g., the second anchor 311-2 to the Nth anchor 311-N of FIG. 3, or the first slave anchor 1005-1 to the Nth slave anchor 1005-N of FIG. 10) or the at least one other external electronic device is obtainable, select the at least one additional ranging round based on the location information of the at least one external electronic device (e.g., the second anchor 311-2 to the Nth anchor 311-N of FIG. 3, or the first slave anchor 1005-1 to the Nth slave anchor 1005-N of FIG. 10) or the at least one other external electronic device.

Figure 3:
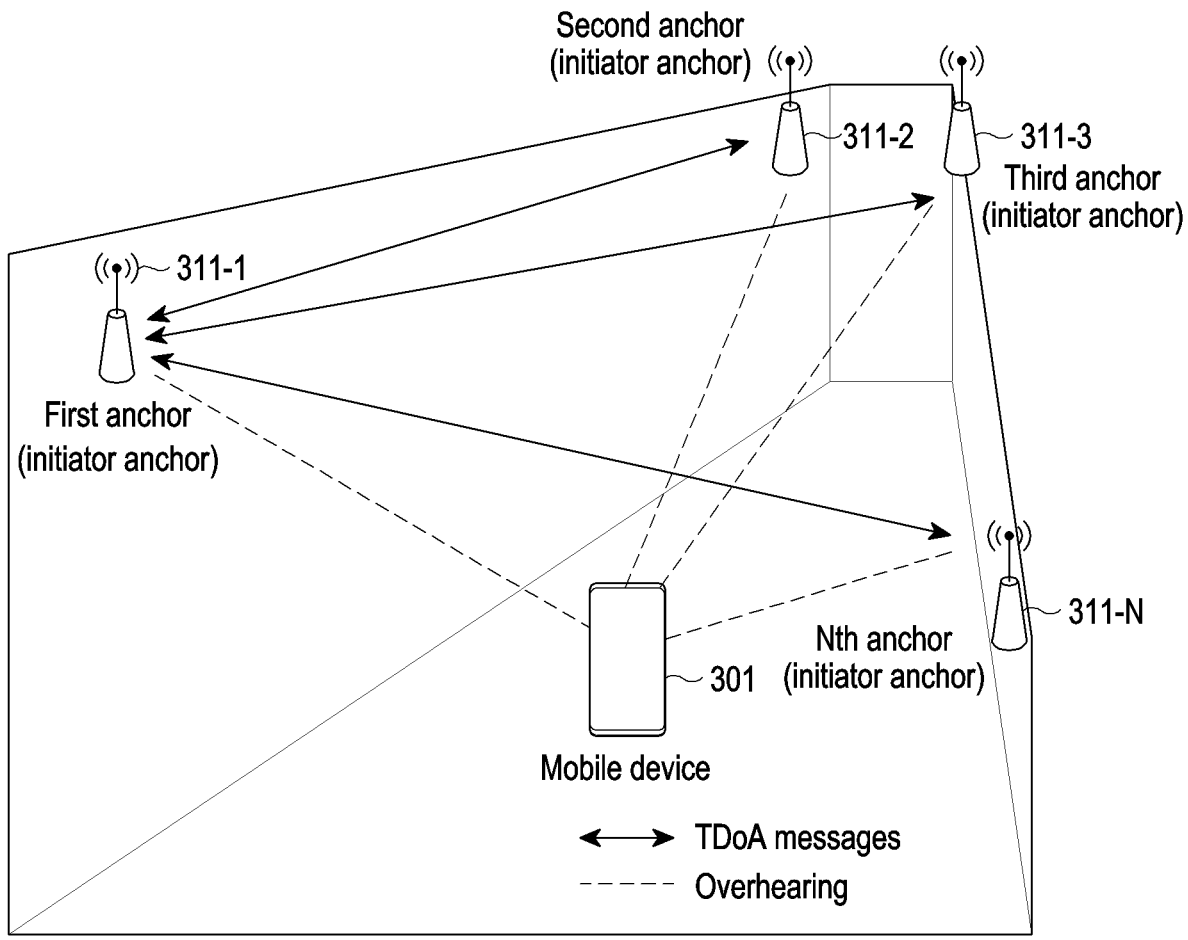
FIG. 3 is a diagram schematically illustrating an example of an architecture of a wireless communication network using a downlink (DL) time difference of arrival (TDoA) scheme according to various embodiments.
Figure 10:
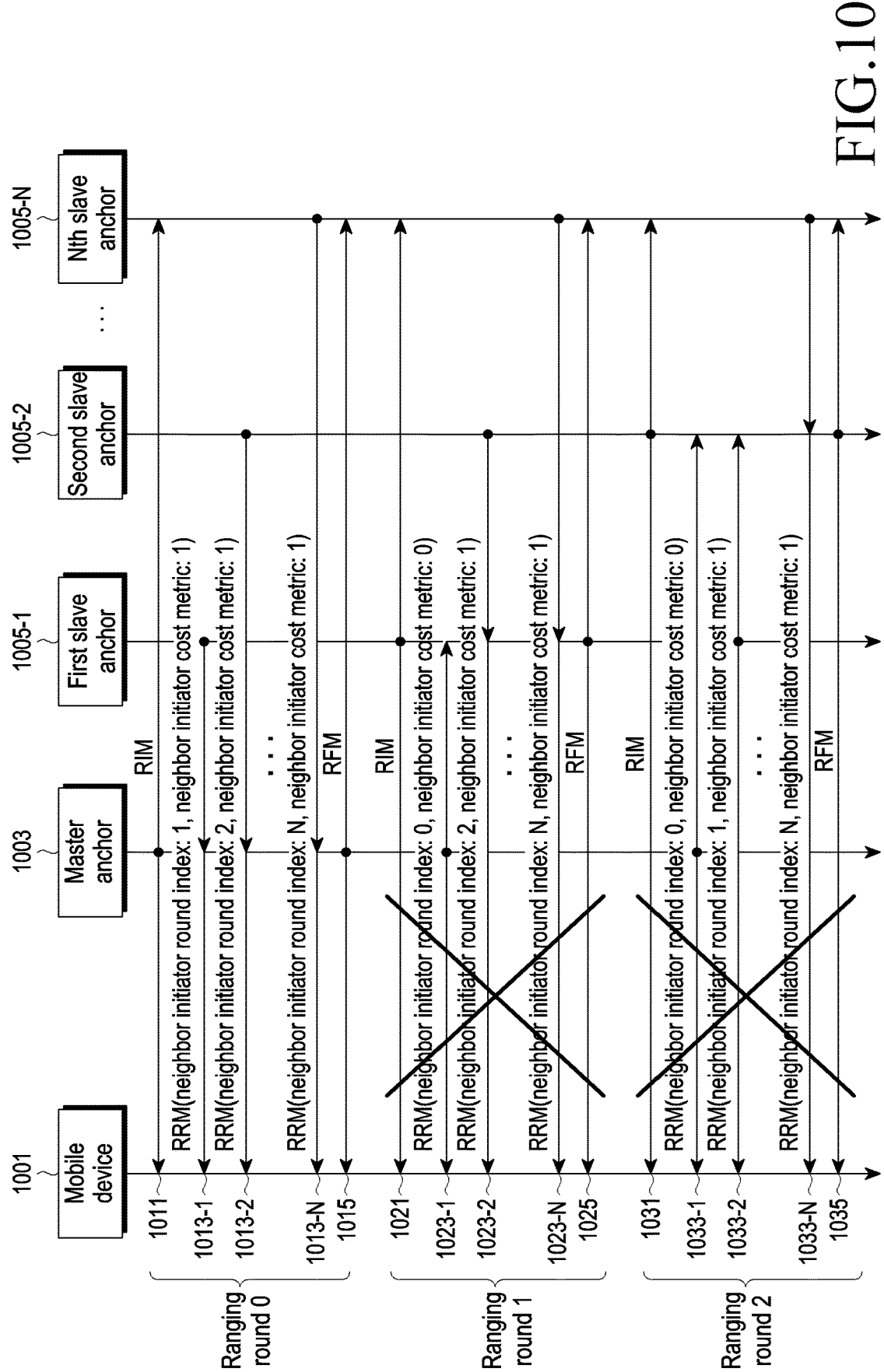
FIG. 10 is a diagram schematically illustrating an example of a ranging operation in a wireless communication network according to various embodiments.

According to various embodiments of the disclosure, the at least one processor 204 may be further configured to determine a period in which the electronic device (e.g., the electronic device 101 of FIG. 1, the mobile device 301 of FIG. 3, or the mobile device 1001 of FIG. 10) performs a ranging operation in the at least one additional ranging round based on a moving speed of the electronic device (e.g., the electronic device 101 of FIG. 1, the mobile device 301 of FIG. 3, or the mobile device 1001 of FIG. 10).

According to various embodiments of the disclosure, the at least one processor 204 may be further configured to, if the state of the first cell is a state in which the set condition is unsatisfied, select, as the at least one additional ranging round in which the ranging operation is to be performed in the second ranging block, a ranging round which corresponds to the round index, which is included in the RRM received from the at least one external electronic device (e.g., the second anchor 311-2 to the Nth anchor 311-N of FIG. 3, or the first slave anchor 1005-1 to the Nth slave anchor 1005-N of FIG. 10), of the ranging round in which the at least one external electronic device (e.g., the second anchor 311-2 to the Nth anchor 311-N of FIG. 3, or the first slave anchor 1005-1 to the Nth slave anchor 1005-N of FIG. 10) performs the ranging operation as the responder in the at least one other neighbor cell.

According to various embodiments of the disclosure, an electronic device (e.g., a second anchor 311-2 to an Nth anchor 311-N of FIG. 3, or a first slave anchor 1005-1 to an Nth slave anchor 1005-N of FIG. 10) may comprise a communication circuit 202, and at least one processor 204 operatively connected to the communication circuit 202, and the at least one processor 204 may be configured to generate a RRM including a neighbor initiator round index field indicating a round index of a ranging round in which the electronic device (e.g., the second anchor 311-2 to the Nth anchor 311-N of FIG. 3, or the first slave anchor 1005-1 to the Nth slave anchor 1005-N of FIG. 10) performs a ranging operation as an initiator in a neighbor cell, and a neighbor initiator cost metric field indicating a number of hops between a reference cell in which a reference external electronic device exists and the neighbor cell. The at least one processor 204 may be further configured to transmit, via the communication circuit 202, the RRM in at least one ranging round within a first ranging block.

According to various embodiments of the disclosure, the RRM may further include a neighbor round index field indicating a round index of a ranging round in which the electronic device (e.g., the second anchor 311-2 to the Nth anchor 311-N of FIG. 3, or the first slave anchor 1005-1 to the Nth slave anchor 1005-N of FIG. 10) performs a ranging operation as a responder in at least one other neighbor cell.

According to various embodiments of the disclosure, the RRM may further include a neighbor round index length field indicating a length of the neighbor round index field.

According to various embodiments of the disclosure, the RRM may further include a neighbor initiator round index preset field indicating whether the neighbor initiator round index field is present, a neighbor initiator round index present field indicating whether the neighbor round index field is present, and/or a neighbor initiator cost metric present field indicating whether the neighbor initiator cost metric field is present.

FIG. 3 is a diagram schematically illustrating an example of an architecture of a wireless communication network using a downlink (DL) time difference of arrival (TDoA) scheme according to various embodiments.

Referring to FIG. 3, a wireless communication network may include an electronic device, e.g., a mobile device 301 (e.g., an electronic device 101 of FIG. 1), external electronic devices, e.g., N anchors (e.g., a second anchor 311-2 to an Nth anchor 311-N, hereinafter anchor 311). The wireless communication network illustrated in FIG. 3 may be based on a UWB, and hereinafter, the wireless communication network which is based on the UWB will be referred to as a UWB network.

In an embodiment, an anchor 311 may be a UWB equipped device with known and fixed coordinates. In an embodiment, the anchor 311 may perform a double-sided two-way ranging (DS-TWR) operation and may be configured through out-of-band (OOB) (wired or wireless) communications. In an embodiment, an OOB communication may be a communication which is based on a Bluetooth scheme, e.g., a Bluetooth low energy (BLE) scheme. In an embodiment, the anchor 311 may compensate for a clock offset and estimate a clock drift of the anchor 311 for other one or more anchors 311.

In an embodiment, the anchor 311 may operate as a master anchor or a slave anchor. In a corresponding cell, the master anchor 311 may perform both an initiator role and a responder role. In the corresponding cell, a slave anchor 311 may perform only the responder role. In an embodiment, an initiator may be a master anchor 311 initiating a ranging operation. In an embodiment, a responder may be a master anchor 311 or a slave anchor 311 which responds to the initiator. Hereinafter, for convenience of a description, an anchor 311 which performs the initiator role will be referred to as an "initiator anchor", and an anchor 311 which performs the responder role will be referred to as a "responder anchor". In an embodiment, a master anchor 311 whose time is used as time reference of the wireless communication network will be referred to as a "reference anchor". In an embodiment, a cell in which the reference anchor is located will be referred to as a "reference cell".

In an embodiment, a mobile device 301 may be a user device that has a UWB capability, that may perform an overhearing operation for downlink TDoA messages (DTMs), and that is capable of calculating a location of the user device itself based on a DL TDoA scheme. In an embodiment, the DL TDoA scheme may be a localization scheme which is based on a TDoA of messages transmitted by anchors 311. In an embodiment, a DTM may be a UWB message used for the DL TDoA scheme which is transmitted by anchors 311. In an embodiment, the mobile device 301 may receive DTMs from one or more anchors 311, measure reception time of each DTM, obtain location information of the anchors 311 which are deployed through one of an in-band method or an OOB method, and calculate a location of the mobile device 301 itself based on TDoA measurement values and location information of the anchors 311. In an embodiment, the OOB method may be a method which is based on a BLE scheme.

In FIG. 3, it may be assumed that a first anchor 311-1 is an initiator anchor, and that each of the second anchors 311-2 to the Nth anchors 311-N is a responder anchor. The first anchor 311-1 to the Nth anchor 311-N may exchange DTMs. In an embodiment, the first anchor 311-1 to the Nth anchor 311-N may be pre-installed, and in other embodiments, information about locations of the first anchor 311-1 to the Nth anchor 311-N may be provided to the mobile device 301. There may be various schemes of providing the mobile device 301 with the information about the locations of the first anchor 311-1 to the Nth anchors 311-N. For example, the information about the locations of the first anchor 311-1 to the Nth anchor 311-N may be wirelessly transferred to the mobile device 301 or may be pre-stored in the mobile device 301. In an embodiment, the information about the locations of the first anchor 311-1 to the Nth anchor 311-N may be stored in a server (e.g., a server 108 of FIG. 1), and the server may transmit the information to the mobile device 301.

In an embodiment, the first anchor 311-1 to the Nth anchor 311-N may exist in a line of sight of the mobile device 301. A transmission timing and a role (e.g., an initiator role or a responder role) of each anchor 311 in a specific time slot may be preset before an operation of each anchor 311. In an embodiment, an initiator anchor (e.g., the first anchor 311-1) may be an anchor 311 which initiates a TDoA ranging session by transmitting a first DTM in a specific ranging round. In an embodiment, each of responder anchors (e.g., the second anchor 311-2 to the Nth anchor 311-N) is an anchor 311 which responds to the first DTM transmitted by the initiator anchor in the specific ranging round.

In an embodiment, the mobile device 301 may receive a DTM from each of the initiator anchor (e.g., the first anchor 311-1) and the responder anchors (e.g., the second anchor 311-2 to the Nth anchor 311-N), and measure TDoAs based on the received DTMs. In an embodiment, if the location of the mobile device 301 is implemented as a two-dimensional (2D) location, the mobile device 301 may measure three or more TDoAs to detect the location of the mobile device 301. In an embodiment, if the location of the mobile device 301 is implemented as a three-dimensional (3D) location, the mobile device 301 may measure four or more TDoAs. The mobile device 301 may estimate the location of the mobile device 301 itself based on the TDoA measurement values and given location information of the anchors 311.

Figure 4:
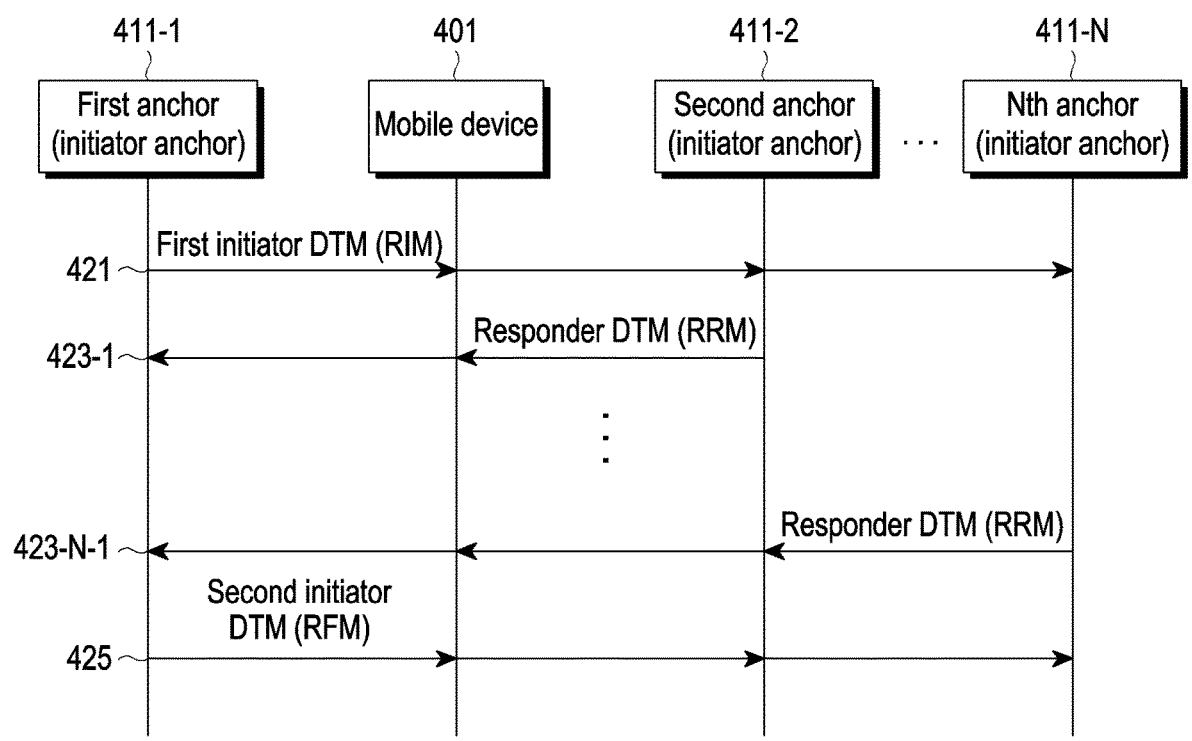
FIG. 4 is a diagram schematically illustrating an example of a message exchange procedure during a ranging round in a wireless communication network according to various embodiments.

FIG. 4 is a diagram schematically illustrating an example of a message exchange procedure during a ranging round in a wireless communication network according to various embodiments.

Referring to FIG. 4, a wireless communication network may include an electronic device, e.g., a mobile device 401 (e.g., an electronic device 101 of FIG. 1 or a mobile device 301 of FIG. 3), and external electronic devices, e.g., N anchors (e.g., a first anchor 411-1 to an Nth anchor 411-N, hereinafter anchor 411). The wireless communication network illustrated in FIG. 4 may be a UWB network. In the same cell (e.g., a serving cell), the first anchor 411-1 may be an initiator anchor, and each of the second anchor 411-2 to Nth anchor 411-N may be a responder anchor.

In an embodiment, the first anchor 411-1 to the Nth anchor 411-N may perform a message exchange procedure according to the following.

In operation 421, the first anchor 411-1, which is the initiator anchor, may initiate a ranging round by transmitting a first initiator DTM (e.g., a ranging initiation message (RIM)) to the responder anchors (e.g., the second anchor 411-2 to the Nth anchor 411-N). In an embodiment, a ranging block may be a time interval for a ranging operation, and each ranging block may include a plurality of ranging rounds. In an embodiment, the ranging operation may be an operation for measuring time synchronization between anchors 411 and a location of a mobile device 401. Through the ranging operation, the mobile device 401 may receive ranging signals (e.g., an RIM, a RRM, and a ranging final message (RFM)) from the anchors 411, and may measure TDoAs for the anchors 411 based on the received ranging signals. For example, the mobile device 401 may overhear the ranging signals exchanged between the anchors 411, and measure the TDoAs for the anchors 411 based on the overheard ranging signals.

In an embodiment, the ranging round may be an interval which is sufficient to complete one entire range-measurement related to a set of enhanced ranging capable devices (ERDEVs) participating in the ranging operation. In an embodiment, the RIM may include scheduling information for a ranging round unless the scheduling information is pre-configured.

Each of the second anchor 411-2 to the Nth anchor 411-N which receives an RIM from the first anchor 411-1 may transmit a responder DTM (e.g., an RRM) which is a response message to the RIM in a corresponding ranging slot. For example, in operation 423-1, the second anchor 411-2 may transmit the RRM to the first anchor 411-1 in the corresponding ranging slot, and in operation 423-N-1, the Nth anchor 411-N may transmit the RRM to the first anchor 411-1 in the corresponding ranging slot. In an embodiment, if scheduling information is included in an RIM, a ranging slot for each responder anchor 411 may be allocated by the scheduling information. In an embodiment, the ranging slot for each responder anchor 411 may be pre-configured. In an embodiment, an RRM may include a transmission (TX) timestamp and a reply time parameter. In an embodiment, each responder anchor 411 may synchronize a clock of each responder anchor 411 to a clock of the initiator anchor 411.

The first anchor 411-1 receiving the RRM from each of the second anchor 411-2 to the Nth anchor 411-N, in operation 425, may transmit a second initiator DTM (e.g., an RFM) to the second anchor 411-2 to the Nth anchor 411-N. In an embodiment, an RFM may include first round-trip time (RTT) and response time parameters. In an embodiment, the first RTT may indicate a time difference between a transmission timing of the RIM and a transmission timing of the RRM. In an embodiment, the response time parameters may include an address and response time. In an embodiment, the address may be a medium access control (MAC) address of a responder anchor, and the response time may be response time of the responder anchor, and may be time elapsed between reception of the RIM and transmission of the RRM.

In an embodiment, the mobile device 401 may overhear the RIM transmitted from the first anchor 411-1, the RRM transmitted from each of the second anchor 411-2 to the Nth anchor 411-N, and the RFM transmitted from the first anchor 411-1, and detect a location of the mobile device 401 itself based on the overheard RIM, RRMs, and RFM.

In an embodiment, the mobile device 401 may perform a ranging operation in other ranging rounds by monitoring all ranging rounds included in the corresponding ranging block even though the mobile device 401 has performed the ranging operation in the ranging round set in the serving cell of the mobile device 401 itself to already detect the location of the mobile device 401 itself. In this case, even though the location of the mobile device 401 has already been detected, an unnecessary ranging operation may be performed, such that it may cause unnecessary current consumption.

Figure 5:
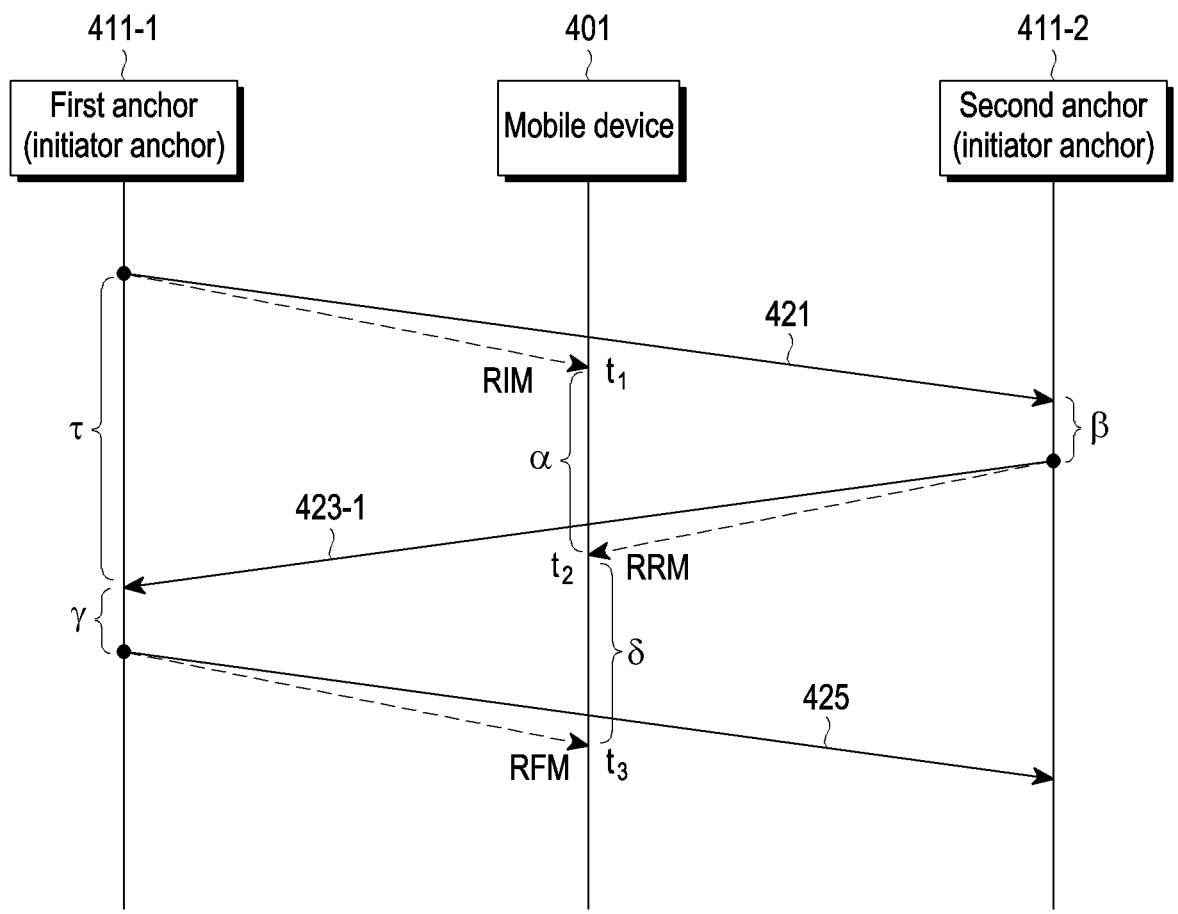
FIG. 5 is a diagram schematically illustrating an example of a location detecting process of an electronic device in a wireless communication network according to various embodiments.

FIG. 5 is a diagram schematically illustrating an example of a location detecting process of an electronic device in a wireless communication network according to various embodiments.

Referring to FIG. 5, a wireless communication network may include an electronic device, e.g., a mobile device 401 (e.g., an electronic device 101 of FIG. 1 or a mobile device 301 of FIG. 3), and external electronic devices, e.g., two anchors (e.g., a first anchor 411-1 or a second anchor 411-2). The wireless communication network illustrated in FIG. 5 may be a UWB network. In the same cell (e.g., a serving cell), the first anchor 411-1 may be an initiator anchor, and the second anchor 411-2 may be a responder anchor.

In an embodiment, the mobile device 401 may detect a location of the mobile device 401 itself based on one of two types of localization algorithms (e.g., a time-measurement-based algorithm and a time stamp-based algorithm) in every ranging round. In an embodiment, the mobile device 401 may select one of the time-measurement-based algorithm and the time stamp-based algorithm based on received DTMs, and detect the location of the mobile device 401 itself according to the selected localization algorithm. In FIG. 5, it may be assumed that the mobile device 401 detects the location of the mobile device 401 using the time-measurement-based algorithm.

In an embodiment, for the time-measurement-based algorithm, the mobile device 401 may obtain the following values through DTMs exchanged between a pair of the initiator anchor 411-1 and the responder anchor 411-2 in a ranging round.

(1) β

β may indicate a response time of the responder anchor 411-2. β may be obtained through an RRM, and the responder anchor 411-2 may calculate β by compensating for an offset and a clock drift for the initiator anchor 411-1.

(2) τ

τ may represent RTT of the initiator anchor 411-1. τ may be obtained through an RFM.

(3) γ

γ may represent response time of the initiator anchor 411-1. γ may be obtained through an RFM.

In an embodiment, the mobile device 401 may measure the following values using reception time of DTMs exchanged between the pair of the initiator anchor 411-1 and the responder anchor 411-2 in the ranging round.

(1) α

α may be a time duration between $t_1$ and $t_2$, $t_1$ may be reception time of an RIM, and $t_2$ may be reception time of an RRM.

(2) δ

δ may be a time duration between $t_2$ and $t_3$, and $t_3$ may be reception time of an RFM.

In an embodiment, the mobile device 401 may calculate a distance difference between $d_1$ and $d_2$, $d_1$ may be a distance between the initiator anchor 411-1 and the mobile device 401, and $d_2$ may be a distance between the responder anchor 411-2 and the mobile device 401. $d_2-d_1$ may be referred to as a hyperboloid.

In an embodiment, the mobile device 401 may calculate the hyperboloid $d_2-d_1$ using Equation 1 below.

$$d_2 - d_1 = \left((\alpha - \delta) \times \frac{\tau + \gamma}{\alpha + \delta} - (\beta - \gamma)\right) \times C/2 \quad \text{[Eq. 1]}$$

In Equation 1, C may represent a speed of light.

In Equation 1, $(\alpha-\delta)/2$ may be time taken until the mobile device 401 receives a signal (e.g., an RRM) from the responder anchor 411-2, and $(\beta-\gamma)/2$ may be time taken until the mobile device 401 receives a signal (e.g., an RFM) from the initiator anchor 411-1. In Equation 1, $(\tau-\gamma)/(\alpha-\delta)$ may be a value for compensating for clock drifts of the initiator anchor 411-1 and the responder anchor 411-2.

In the same cell (e.g., a serving cell), for an initiator anchor and all responder anchors, a distance between the initiator anchor and a mobile device and a distance between each of the responder anchors and the mobile device may be detected in the same manner as described in FIG. 5, and a difference between the distance between the initiator anchor and the mobile device and the distance between each of the responder anchors and the mobile device may be obtained. In this way, as illustrated in FIG. 6, a plurality of hyperbolas may be drawn in a coordinate plane.

Figure 6:
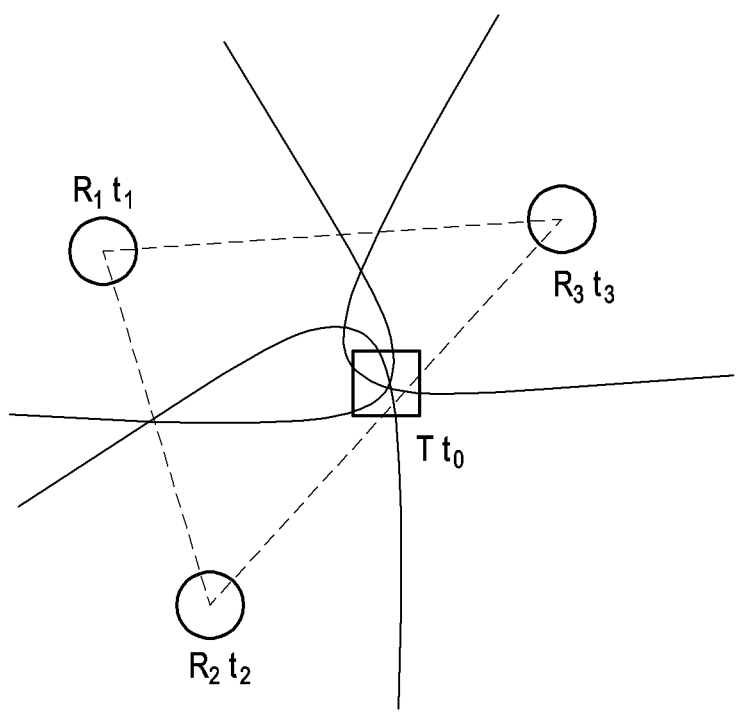
FIG. 6 is a diagram schematically illustrating another example of a location detecting process in a wireless communication network according to various embodiments.

FIG. 6 is a diagram schematically illustrating another example of a location detecting process in a wireless communication network according to various embodiments.

Referring to FIG. 6, in a DL TDoA scheme, for 2D localization, three pairs of an initiator anchor and a responder anchor may be used for a mobile device to calculate a location of the mobile device using one (e.g., an iterative algorithm) of a set of algorithms, and at least three hyperbolas may be calculated based on the three pairs of the initiator anchor and the responder anchor. For 3D localization, four pairs of the initiator anchor and the responder anchor may be used for the mobile device to calculate the location of the mobile device using the one (e.g., the iterative algorithm) of the set algorithms, and at least four hyperbolas may be calculated based on the four pairs of the initiator anchor and the responder anchor. In an embodiment, for all pairs of the initiator anchor and the responder anchor, the initiator anchor may be a master anchor.

In FIG. 6, the three hyperbolas in a case that the 2D localization is assumed are illustrated on a coordinate plane, and as shown in FIG. 6, a point (e.g., a point $T_{r0}$) at which the three hyperbolas intersect may be determined as a location of the mobile device.

In an embodiment, deployment of anchors in the wireless communication network may be implemented at a time point at which anchors are installed, and each anchor 411 may transmit at least one of an RIM, an RRM, or an RFM in a set ranging round.

In an embodiment, an anchor which has performed an initiator role in a specific ranging round may perform a responder role in another ranging round according to a situation. In an embodiment, an initiator anchor may represent a ranging capable device (RDEV) which initiates a ranging exchange by transmitting a ranging frame (RFRAME) in the ranging exchange, and a responder anchor may represent an RDEV which responds to an ranging initiation RFRAME.

In an embodiment, in a DL TDoA scheme of the wireless communication network, an electronic device may need to wait in order to receive UWB messages while a reception (RX) chain is always in an on-state. A case in which the electronic device waits in order to receive the UWB messages while the RX chain is continuously in the on-state may cause unnecessary current consumption, and, as such, may shorten use time of the electronic device.

Conventionally, in the DL TDoA scheme, a scheme in which the electronic device may know which neighbor cells use certain ranging rounds may not be provided; thus, a scheme of determining which neighbor cell is suitable for the electronic device among the neighbor cells in a case that the electronic device moves is not provided.

Various embodiments of the disclosure may provide a device and method for selecting an active ranging round while allowing to reduce a consumed current in a wireless communication network. According to an embodiment, in the wireless communication network, an electronic device (e.g., an electronic device 101 of FIG. 1 or a mobile device 301 of FIG. 3) may detect a location of the electronic device itself even though a ranging operation is successful in only one ranging round, such that the electronic device may not need to perform a monitoring operation for a plurality of ranging rounds. According to an embodiment, in the wireless communication network, the electronic device may minimize a consumed current by performing a ranging operation only for a single ranging round (e.g., an active ranging round). In an embodiment, the active ranging round may be a ranging round in which the electronic device performs the ranging operation. In an embodiment, the electronic device may perform the ranging operation in the active ranging round among ranging rounds included in a ranging block, and if a set condition is satisfied, or if necessary, the electronic device may select at least one additional ranging round in which the ranging operation will be additionally performed.

In an embodiment, a good state may refer to a state of a cell satisfying the set condition. In an embodiment, the good state may be a case in which a weight that is obtained for a corresponding cell based on a combination of signal quality, path quality, a FoV, a LoS, and/or a neighbor initiator cost metric is greater than or equal to a set threshold value, or a case in which the number of received RRMs is greater than a set number (e.g., three). The good state is described in more detail in reference to FIG. 10.

In an embodiment, a bad state may refer to a state of a cell which does not satisfy the set condition. For example, the electronic device may determine that the state of the cell is the bad state if the weight which is obtained for the corresponding cell based on the combination of the signal quality, the path quality, the FoV, the LoS, and/or the neighbor initiator cost metric is less than the set threshold value, or if the number of received RRMs is less than or equal to the set number (e.g., three). The bad state is described in more detail in reference to FIG. 10, and, as such, a detailed description thereof is omitted herein.

Figure 7:
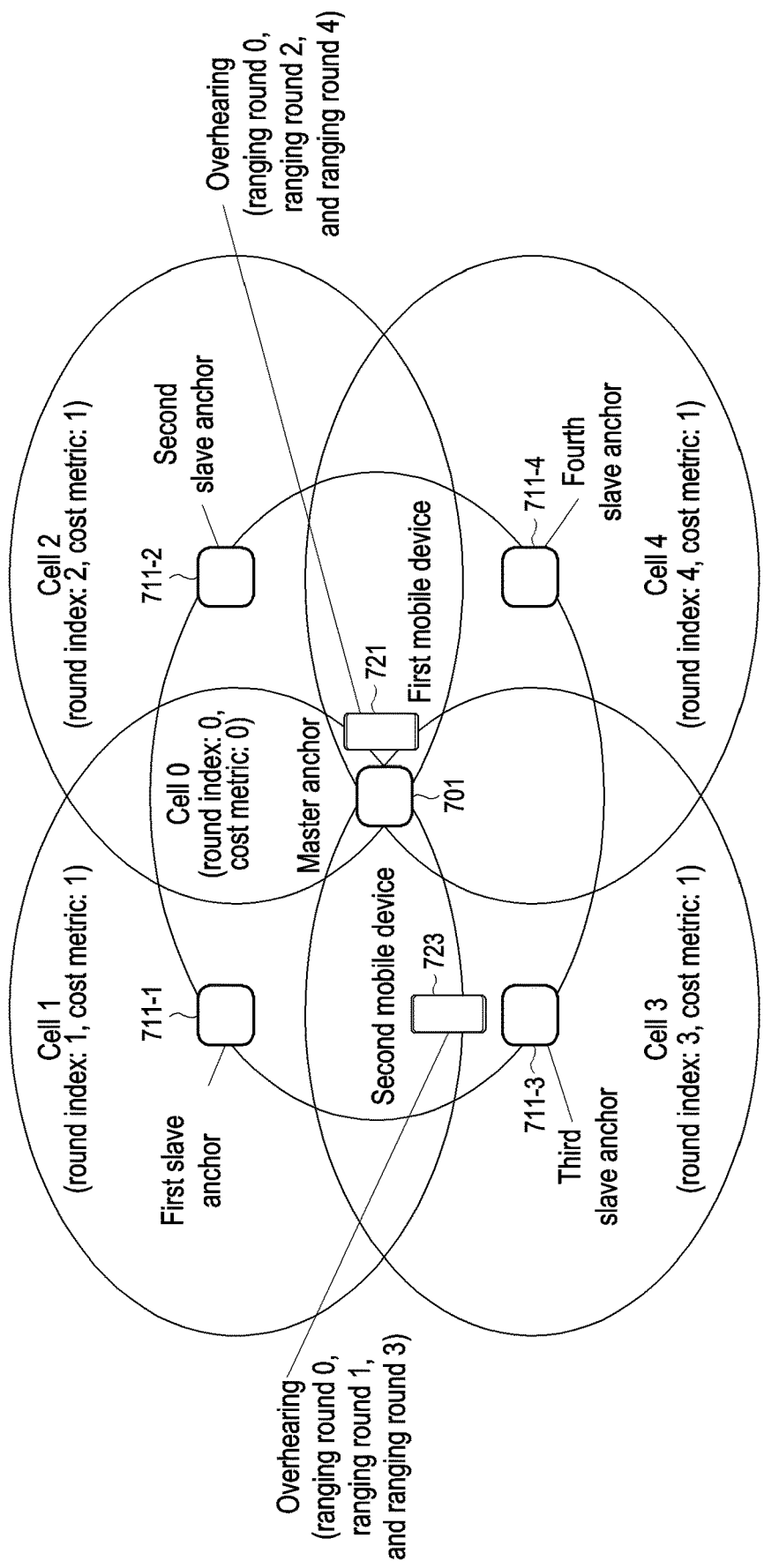
FIG. 7 is a diagram schematically illustrating another example of an architecture of a wireless communication network according to various embodiments.

FIG. 7 is a diagram schematically illustrating another example of an architecture of a wireless communication network according to various embodiments.

Referring to FIG. 7, it may be assumed that a wireless communication network, (e.g., a UWB network which is based on a UWB) supports a DL TDoA scheme. A case that a total of five cells (e.g., a cell 0, a cell 1, a cell 2, a cell 3, and a cell 4) are included in the wireless communication network is illustrated in FIG. 7. In an embodiment, an anchor may exist in each cell. For example, a master anchor 701 operating as an initiator anchor in a corresponding ranging block may exist in the cell 0, a first slave anchor 711-1 operating as a responder anchor in the corresponding ranging block may exist in the cell 1, a second slave anchor 711-2 operating as the responder anchor in the corresponding ranging block may exist in the cell 2, a third slave anchor 711-3 operating as the responder anchor in the corresponding ranging block may exist in the cell 3, and a fourth slave anchor 711-4 operating as the responder anchor in the corresponding ranging block may exist in the cell 4. In an embodiment, a slave anchor may perform a role of a responder in a corresponding ranging block, but may also perform a role of an initiator in another ranging block.

In FIG. 7, it may be assumed that time of the master anchor 701 operating as the initiator in the cell 0 is used as a time reference of the wireless communication network. In an embodiment, each cell included in the wireless network may be time-synchronized to the master anchor 701 of the cell 0.

In an embodiment, a cost metric may represent the number of hops between a reference cell which is a cell in which the master anchor 701, which is a reference anchor, exists and an arbitrary cell. In an embodiment, the cost metric may be a metric for setting a time synchronization hierarchy or a tree within a multi-hop network topology for a DL TDoA. According to an embodiment, based on the cost metric, anchors may determine whether to need to depend on other anchors as time sources for overall time synchronization of the wireless communication network. In an embodiment, the cost metric may reflect a communication cost from one anchor to an initiator anchor (e.g., a reference anchor) which provides a service as time reference for the wireless communication network.

In an embodiment, the initiator anchor which provides the service as the time reference may have the lowest cost metric in the wireless communication network. In an embodiment, anchors may include cost metrics of the anchors in DTMs such that that other anchors may join and synchronize to the wireless communication network, and participate in corresponding ranging rounds. In an embodiment, if an electronic device receives a DTM from another anchor which has a cost metric greater than or equal to a current cost metric (e.g., a cost metric of a serving cell), the electronic device may not need to depend on the other anchor which has the cost metric greater than or equal to the current cost metric for time synchronization. In an embodiment, if the electronic device receives a DTM from another anchor which has a cost metric less than the current cost metric (e.g., the cost metric of the serving cell), the electronic device may select another anchor (e.g., the reference anchor) which operates as a time source to enhance (or decrease) the cost metric.

In FIG. 7, for example, a cost metric of a reference cell (e.g., a cell 0) in which the reference anchor (e.g., the master anchor 701) exists may be 0, and each of the cell 1 to the cell 4 which is one hop away from the cell 0 may be 1. In an embodiment, if another cell is connected to each of the cell 1 to the cell 4, a cost metric of the corresponding cell may be 2 because the other cell connected to each of the cell 1 to the cell 4 is two hops away from the cell 0.

In an embodiment, a round index may be an index of a ranging round. In an embodiment, a ranging block may be a time period for ranging, and each ranging block may include a plurality of ranging rounds. A ranging round may be a period which is sufficient to complete one full range-measurement related to a set of ERDEVs participating in a ranging exchange. A structure of a ranging block in a wireless communication network will be described with reference to FIG. 8.

Figure 8:
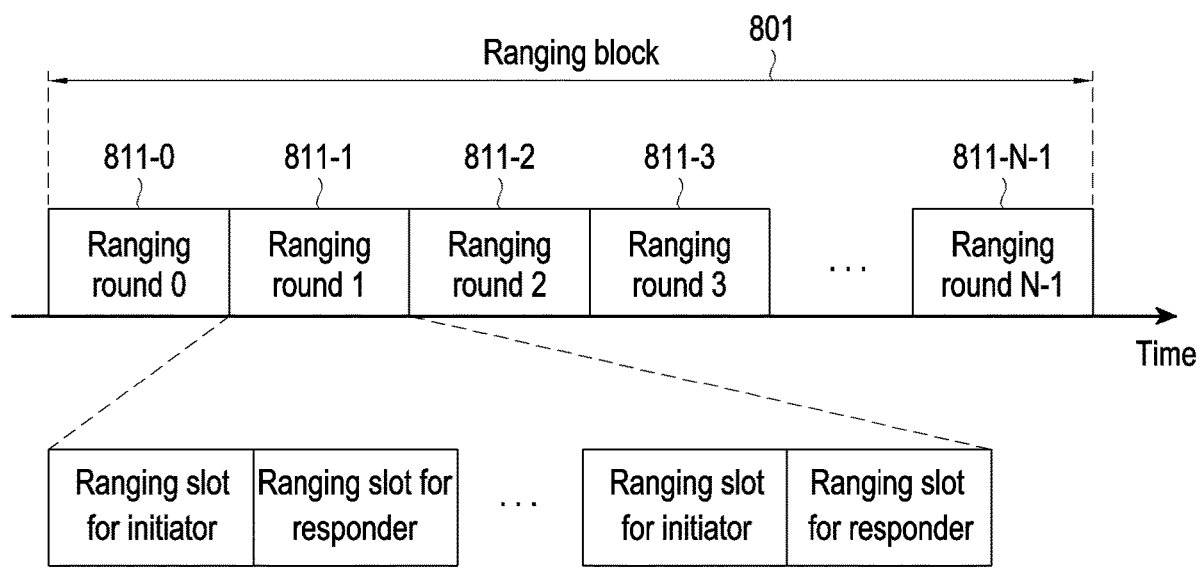
FIG. 8 is a diagram schematically illustrating an example of a structure of a ranging block in a wireless communication network according to various embodiments.

FIG. 8 is a diagram schematically illustrating an example of a structure of a ranging block in a wireless communication network according to various embodiments.

Referring to FIG. 8, one ranging block 801 may include a plurality of, for example, N ranging rounds (e.g., a ranging round 0 811-0, a ranging round 1 811-1, a ranging round 2 811-2, and a ranging round 3 811-3 to a ranging round N−1 811-N−1). A duration of the ranging block 801 may be determined in consideration of a delay requirement. Generally, a speed of a pedestrian is 1.5 meter/sec, and for supporting precise localization accuracy, the duration of the ranging block 801 may be shorter than 100 milliseconds.

In an embodiment, a duration of a ranging round may be determined in consideration of the number of responder anchors covered by each initiator anchor. An initiator anchor may manage a ranging round of an initiator anchor, and may notify information about the ranging round to responder anchors related to the initiator anchor through a DTM.

In an embodiment, the number of ranging rounds included in a ranging block may be determined in consideration of deployment of anchors (e.g., a density of initiator anchors) and other requirements of services provided with a DL TDoA. In an embodiment, if the density of the initiator anchors is less than a threshold density, the number of ranging rounds included in one ranging block may be reduced. If a service provider wants to increase a TDoA frequency, a length of a ranging block may be shortened by removing unused ranging rounds included in the ranging block. If the service provider wants to enhance robustness of a TDoA, the initiator anchors may use the unused ranging rounds included in the ranging block using a hopping mechanism.

In an embodiment, the number of ranging slots included in a ranging round may be determined according to the number of responder anchors related to the initiator anchor. The number of ranging slots included in the ranging round may be greater than a value obtained by adding a set number (e.g., 2) to the number of responder anchors.

Referring back to FIG. 7, all cells included in the wireless communication network are time-synchronized to the master anchor 701, such that a ranging block may be simultaneously started in all cells included in the wireless communication network. In an embodiment, if a round index is set differently for each cell in the wireless communication network, all anchors included in the wireless communication network may perform a ranging operation without collision. For example, if the round index is set differently for each cell, the ranging round in which the initiator anchor transmits the RIM and the RFM is also set differently for each cell, such that all anchors included in the wireless communication network may perform the ranging operation without collision.

In an embodiment, for efficiently configuring the wireless communication network (e.g., in a manner which reduces the number of anchors), consideration may be needed for deployment of anchors at a time point at which the wireless communication network is first designed, but also additional anchors that may be deployed at a later time. In an embodiment, if a first anchor which is an anchor operating as an initiator in a specific cell is added to the wireless communication network, the first anchor may receive a DTM from anchors operating as an initiator in one or more other cells. The first anchor receiving DTMs from the anchors operating as the initiator in the one or more other cells may detect the number of hops of the first anchor itself based on cost metrics included in the DTMs received from the anchors operating as the initiator in the one or more other cells. In an embodiment, the first anchor may select a round index in which the first anchor itself will perform a ranging operation. For example, the first anchor may recognize round indexes used in the vicinity by receiving RRMs transmitted from neighbor anchors, such that the first anchor may select another round index which is not the round indexes used in the vicinity as the round index of the first anchor itself.

In FIG. 7, the location of the master anchor 701 is presented as an example for a description, and the master anchor 701 may not necessarily be limited to being located at a central point of the wireless communication network.

In FIG. 7, in a ranging block, an electronic device continuously performs a monitoring operation after turning on a UWB RX, thereby performing a ranging operation in not only in a ranging round set for a serving cell but also in all of ranging rounds for a plurality of neighbor cells.

For example, the first electronic device 721 whose serving cell is the cell 0 may turn on a UWB RX chain and then perform a monitoring operation for all ranging rounds included in a corresponding ranging block as well as the ranging round 0 set for the cell 0 in the corresponding ranging block. The first electronic device 721 may also perform a ranging operation in ranging rounds (e.g., the ranging round 2 and the ranging round 4) set for the cell 2 and the cell 4 by turning on the UWB RX chain and then performing the monitoring operation for all ranging rounds included in the corresponding ranging block.

For another example, the second electronic device 723 whose serving cell is the cell 3 may turn on a UWB RX chain and then perform a monitoring operation for all ranging rounds included in a corresponding ranging block as well as the ranging round 3 set for the cell 3 in the corresponding ranging block. The second electronic device 723 may also perform a ranging operation in ranging rounds (e.g., the ranging round 0 and the ranging round 1) set for the cell 0 and the cell 1 by turning on the UWB RX chain and then performing the monitoring operation for all ranging rounds included in the corresponding ranging block.

The first electronic device 721 may detect a location of the first electronic device 721 itself by performing the ranging operation in the ranging round (e.g., the ranging round 0) set in the cell 0 as the serving cell. Although the first electronic device 721 has already detected the location of the first electronic device 721 itself, the first electronic device 721 may monitor all ranging rounds included in the corresponding ranging block to perform the ranging operation in the ranging round 2 and the ranging round 4, such that a current may be consumed unnecessarily.

The second electronic device 723 may detect a location of the second electronic device 723 itself by performing the ranging operation in the ranging round (e.g., the ranging round 3) set in the cell 3 which is the serving cell. Although the second electronic device 723 has already detected the location of the second electronic device 723 itself, the second electronic device 723 may monitor all ranging rounds included in the corresponding ranging block to perform the ranging operation in the ranging round 0 and the ranging round 1, such that a current may be consumed unnecessarily.

Figure 9:
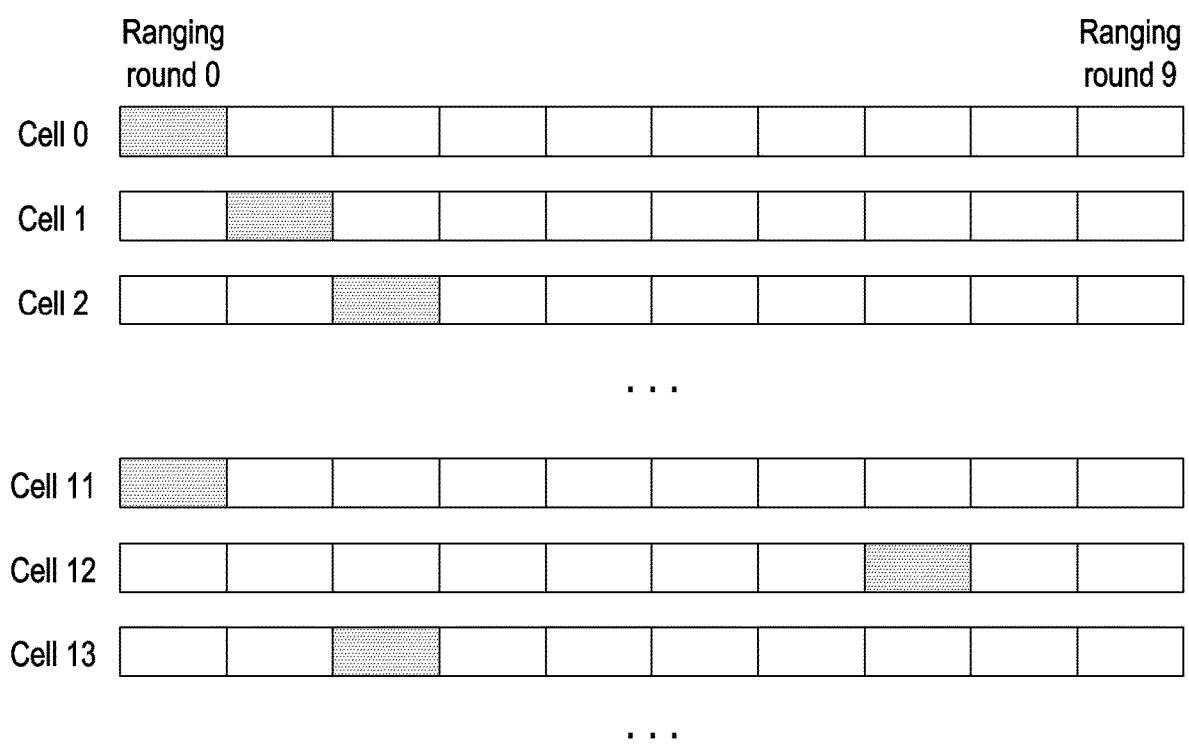
FIG. 9 is a diagram schematically illustrating an example of a scheme in which a ranging block is used in a wireless communication network according to various embodiments.

FIG. 9 is a diagram schematically illustrating an example of a scheme in which a ranging block is used in a wireless communication network according to various embodiments.

Referring to FIG. 9, it may be assumed that a wireless communication network (e.g., a UWB network) includes a plurality of cells, e.g., 14 cells (e.g., a cell 0 to a cell 13), and a ranging block includes a plurality of ranging rounds, e.g., 10 ranging rounds (e.g., a ranging round 0 to a ranging round 9). In an embodiment, a round index different from indexes of neighbor cells may be set for each cell, and an initiator anchor of each cell may transmit an RIM and an RFM in a ranging round set for each cell. In this way, the round index different from the indexes of the neighbor cells is set for each cell, such that all anchors included in the wireless communication network may perform a ranging operation without collision.

For example, for the cell 0, an initiator anchor of the cell 0 performs a ranging operation in the ranging round 0, for a cell 1, an initiator anchor of a cell 1 performs a ranging operation in a ranging round 1, and for a cell 2, an initiator anchor of a cell 2 may perform a ranging operation in a ranging round 2. In this way, for a cell 11, an initiator anchor of the cell 11 may perform a ranging operation in the ranging round 0, for a cell 12, an initiator anchor of the cell 12 may perform a ranging operation in a ranging round 7, and for the cell 13, an initiator anchor of the cell 13 may perform a ranging operation in the ranging round 2. In this way, an initiator anchor of each cell performs a ranging operation in ranging rounds different from ranging rounds of neighbor cells, such that all anchors included in the wireless communication network may perform a ranging operation without collision. In an embodiment, if the initiator anchor of the cell 0 performs the ranging operation in the ranging round 0, and the initiator anchor of the cell 11 performs the ranging operation in the ranging round 0 for the cell 11, the initiator anchor of the cell 0 and the initiator anchor of the cell 11 may be located so as not to affect each other. In an embodiment, a round index used by a corresponding anchor may be set at a time point at which the wireless communication network is designed, or if a new anchor is additionally deployed in the wireless communication network, the round index used by the corresponding anchor may be set in consideration of round indexes set in anchors included in the wireless communication network. In an embodiment, in a case of an anchor newly added to the wireless communication network, the newly added anchor itself may directly select a round index in which a ranging operation will be performed. For example, the newly added anchor may recognize round indexes used in the vicinity by receiving RRMs transmitted from neighbor anchors, and thus may select a different round index other than the round indexes used in the vicinity as a round index of the newly added anchor itself. In an embodiment, the number of ranging rounds included in a ranging block used in the wireless communication network may be determined based on various parameters (e.g., the number of cells included in the wireless communication network, sizes of corresponding cells, and/or a ranging block duration).

In an embodiment, in each ranging round, anchors belonging to the same cell may perform a ranging operation by exchanging an RIM, an RRM, and an RFM, and an electronic device (e.g., a mobile device) may overhear (e.g., sniff) the RIM, the RRM, and the RFM exchanged between the anchors to detect a location of the mobile device itself. In an embodiment, the RIM, the RRM, and the RFM exchanged between the anchors may include a round index and a cost metric of a ranging round in which the anchors perform the ranging operation.

FIG. 10 is a diagram schematically illustrating an example of a ranging operation in a wireless communication network according to various embodiments.

Referring to FIG. 10, a wireless communication network (e.g., a UWB network) may include an electronic device (e.g., an electronic device 101 of FIG. 1 or a mobile device 301 of FIG. 3), e.g., a mobile device 1001, and a total of N+1 anchors, e.g., a master anchor 1003 and N slave anchors (e.g., a first slave anchor 1005-1 to an Nth slave anchor 1005-N).

In an embodiment, it may be assumed that the master anchor 1003 exists in a cell 0 which is a reference cell, and the first slave anchor 1005-1 to the Nth slave anchor 1005-N exist in a cell 1 to a cell N, respectively. In FIG. 10, it may be assumed that the reference cell is a serving cell of the mobile device 1001. In an embodiment, each of the first slave anchor 1005-1 to the Nth slave anchor 1005-N may operate as a responder anchor in the cell 0. In an embodiment, it may be assumed that the first slave anchor 1005-1 may operate as an initiator anchor in the cell 1, and a second slave anchor 1005-2 may operate as an initiator anchor in a cell 2. In this way, it may be assumed that the Nth slave anchor 1005-N may operate as an initiator anchor in the cell N. In an embodiment, it may be assumed that the master anchor 1003 performs a ranging operation as the initiator anchor in a ranging round 0 in the cell 0, the first slave anchor 1005-1 performs a ranging operation as the initiator anchor in a ranging round 1 in the cell 1, the second slave anchor 1005-2 performs a ranging operation as the initiator anchor in a ranging round 2 in the cell 2, and the Nth slave anchor 1005-N performs a ranging operation as the initiator anchor in a ranging round N in the cell N. In an embodiment, it may be assumed that the cell 1 to the cell N are one hop away from the cell 0.

In an embodiment, if a responder anchor transmitting an RRM in one cell operates as an initiator anchor in another cell, the corresponding anchor may include information related to the cell in which the corresponding anchor operates as the initiator anchor in the RRM transmitted by the corresponding anchor if the corresponding anchor operates as the responder anchor. Each of the first slave anchor 1005-1 to the Nth slave anchor 1005-N operates as a responder anchor in the cell 0, such that each of the first slave anchor 1005-1 to the Nth slave anchor 1005-N may include, in an RRM transmitted from the cell 0, information related to a cell in which each of the first slave anchor 1005-1 to the Nth slave anchor 1005-N operates as the initiator anchor. For example, the first slave anchor 1005-1 may operate as an initiator anchor in the cell 1, and include, in an RRM transmitted by the first slave anchor 1005-1, information related to the cell 1 (e.g., a round index set for the cell 1 and a cost metric of the cell 1) in the cell 0 operating as a responder anchor. For example, the round index set for the cell 1 may be 1, and the cost metric of the cell 1 may be 1.

The mobile device 1001 may overhear an RIM, an RRM, and an RFM exchanged between a master anchor and slave anchors belonging to the wireless communication network. The mobile device 1001 may receive an RRM message transmitted from the first slave anchor 1005-1, and recognize, based on the RRM message received from the first slave anchor 1005-1, that there is a cell in which the first slave anchor 1005-1 performs a ranging operation as an initiator in a ranging round (e.g., a ranging round 1) which corresponds to a round index 1 around the mobile device 1001, and the corresponding cell is one hop away from a reference cell (e.g., the cell 0) in which the master anchor 1003 which is a reference anchor exists.

In an embodiment, if information related to a cell (e.g., a round index set for the corresponding cell and a cost metric) in which a slave anchor operates an initiator anchor transmitting a corresponding RRM is included in each of RRMs exchanged between the master anchor 1003 and the first slave anchor 1005-1 to the Nth slave anchor 1005-N belonging to the wireless communication network, the mobile device 1001 may know information related to cells (e.g., information related to all communicable neighbor cells) related to all anchors included in the wireless communication network even though the mobile device 1001 turns on an RX chain in only one ranging round (e.g., a ranging round 0), such that there is no need to turn on the RX chain in other ranging rounds to perform a ranging operation.

In an embodiment, the mobile device 1001 may receive an RIM and an RFM from the master anchor 1003 in the ranging round 0, and receive RRMs exchanged among the master anchor 1003 and the first slave anchor 1005-1 to the Nth slave anchor 1005-N. For example, the mobile device 1001 may receive an RRM including a neighbor initiator round index: 1 and a neighbor initiator cost metric: 1 from the first slave anchor 1005-1, receive an RRM including a neighbor initiator round index: 2 and a neighbor initiator cost metric: 1 from the second slave anchor 1005-2, and in this way, receive an RRM including a neighbor initiator round index: N and a neighbor initiator cost metric: 1 from the Nth slave anchor 1005-N which is the last slave anchor. The mobile device 1001 may detect information (e.g., round indexes set for corresponding neighbor cells and cost metrics of the corresponding neighbor cells) related to neighbor cells which exist around the serving cell in which the mobile device 1001 is currently located based on the neighbor initiator round indexes and the neighbor initiator cost metrics included in the RRMs received from the first slave anchor 1005-1 to the Nth slave anchor 1005-N. Accordingly, the mobile device 1001 may detect a location of the mobile device 1001 itself based on the RIM and the RFM received from the master anchor 1003 in the ranging round 0 within the corresponding ranging block and the RRMs received from the first slave anchor 1005-1 to the Nth slave anchor 1005-N in the ranging round 0 within the corresponding ranging block. Alternatively or additionally, the mobile device 1001 may detect all of the information related to the neighbor cells based on the RRMs received from the first slave anchor 1005-1 to the Nth slave anchor 1005-N in the ranging round 0 within the corresponding ranging block, such that the mobile device 1001 may not need to perform the ranging operation any more in other ranging rounds within the corresponding ranging block. Because there is no need to perform the ranging operation any more in the other ranging rounds within the corresponding ranging block, the mobile device 1001 does not need to turn on a RX chain in the other ranging rounds within the corresponding ranging block, this may prevent unnecessary current consumption.

In an embodiment, because the mobile device 1001 knows information about cells related to all anchors included in the wireless communication network even though, for example, the mobile device 1001 moves to another location, or it is difficult to perform a communication in a ranging round in which a ranging operation is currently being performed due to an obstacle, the mobile device 1001 may select a suitable ranging round, not the ranging round in which the ranging operation is currently being performed, and perform the ranging operation in the selected suitable ranging round.

In an embodiment, a ranging round in which the mobile device 1001 performs a ranging operation will be referred to as an active ranging round. Even if the mobile device 1001 moves, or it is difficult for the mobile device 1001 to perform a communication in a current active ranging round, the mobile device 1001 may select a new active ranging round which is suitable for the mobile device 1001, such that it is possible to provide a seamless service.

In an embodiment, if the mobile device 1001 does not receive the RIM and the RFM transmitted from the master anchor 1003 in the ranging round 0, the mobile device 1001 may not detect a location of the mobile device 1001 itself in the ranging round 0. In an embodiment, even though the mobile device 1001 does not receive the RIM and the RFM transmitted from the master anchor 1003, the mobile device 1001 may overhear RRMs transmitted from responder anchors (e.g., the first slave anchor 1005-1 to the Nth slave anchor 1005-N). The mobile device 1001 may select, as a new active ranging round, a ranging round set for one of neighbor cells based on information related to other cells, e.g., neighbor cells (e.g., the cell 1 to the cell N), included in RRMs transmitted from the first slave anchor 1005-1 to the Nth slave anchor 1005-N, and perform a ranging operation in the new active ranging round.

If the mobile device 1001 fails to receive the RIM and the RFM transmitted from the master anchor 1003 in the ranging round 0 and succeeds in receiving the RRMs transmitted from the first slave anchor 1005-1 to the Nth slave anchor 1005-N, the mobile device 1001 may perform a ranging operation in a ranging round, e.g., an additional ranging round (e.g., the ranging round 1 or the ranging round 2), which is different from the ranging round 0 in the corresponding ranging block. In an embodiment, an active ranging round may be a ranging round in which the mobile device 1001 essentially performs a ranging operation, and an additional ranging round may be a ranging round in which the mobile device 1001 performs a ranging operation if a set condition is satisfied or if necessary.

In an embodiment, a state of a cell satisfying the set condition may be a good state. In an embodiment, the good state may be a case that a weight which is obtained for the corresponding cell based on a combination of signal quality, path quality, an FoV, an LoS, and/or a neighbor initiator cost metric is greater than or equal to a set threshold value or the number of received RRMs is greater than a set number (e.g., three), and the good state will be described in more detail below.

In an embodiment, a state of a cell which does not satisfy the set condition may be a bad state. In an embodiment, the electronic device may determine that the state of the cell is the bad state if the weight which is obtained for the corresponding cell based on the combination of the signal quality, the path quality, the FoV, the LoS, and/or the neighbor initiator cost metric is less than the set threshold value or the number of received RRMs is less than or equal to the set number (e.g., three). The bad state has been described in reference to FIG. 10, and, in the interest of brevity, a description of the bad state is omitted. In an embodiment, the mobile device 1001 may have succeed in receiving the RIM and the RFM transmitted from the master anchor 1003 in the ranging round 0, and may have failed to receive some of the RRMs transmitted from the first slave anchor 1005-1 to the Nth slave anchor 1005-N. Although the mobile device 1001 has failed to receive some of the RRMs transmitted from the first slave anchor 1005-1 to the Nth slave anchor 1005-N, the mobile device 1001 may detect a location of the mobile device 1001 itself. In this case, the mobile device 1001 does not perform a ranging operation in another ranging round, for example, a ranging round 1 or a ranging round 2 in the next ranging block, but the mobile device 1001 may perform a ranging operation in a ranging round 0 which is identical to an active ranging round of the corresponding ranging block. In an embodiment, if the mobile device 1001 succeeds in receiving an RIM and an RFM, and receives at least two RRMs, the mobile device 1001 may detect a location of the mobile device 1001 itself. Even if the mobile device 1001 succeeds in receiving the RIM and RFM, the mobile device 1001 may not detect the location of the mobile device 1001 itself if the mobile device 1001 receives only one RRM. If the mobile device 1001 does not detect the location of the mobile device 1001 itself, the mobile device 1001 may perform a ranging operation in another ranging round, e.g., an additional ranging round (e.g., a ranging round 1 or a ranging round 2) not the ranging round 0 in the corresponding ranging block.

In an embodiment, a DTM (e.g., an RRM) may be implemented as, e.g., a MAC frame, and the MAC frame may include a MAC header and a MAC payload.

A payload information element (IE) content field for the DTM according to an embodiment may be expressed as shown in Table 1 below. In an embodiment, the payload IE content field may be included in the MAC payload.

TABLE 1

| Parameter | Size (bits) | Notes |
| --- | --- | --- |
| Vendor OUI | 24 | 0x5A18FF |
| UWB Message ID | 4 | 0x07 = TDoA Message |
| Reserved | 4 | Reserved for future use |
| Message Control | 16 | Configuration of the message |
| Block Index | 16 | Block index of the current ranging block |
| Round Index | 16 | Round index of the current ranging round |
| TX Timestamp | 64 | Transmission timestamp (in units of 15.65 ps) in the common time base |
| Ranging Device Management List | 0/24*N | N Ranging Device Management List Elements |
| CFO | 0/16 | Clock frequency offset with respect to initiator (in the unit of ppm) |
| Reply Time List | 0/48*M | M Reply Time List Elements |
| Responder Reply Time | 0/32 | Reply time of responder in the common time base |
| Cost Metric | 0/8 | Routing metric for multi-hop synchronization in multi-cell scenarios |
| Neighbor Round Index Length | 0/8 | Number of bytes for Neighbor Round index field |
| Neighbor Round Index | 0/8*L | Round index of the ranging round which is participating by current responder in adjacent cell |
| Neighbor Initiator Round Index | 0/16 | Round index of the ranging round which is using by current responder in adjacent cell as initiator |
| Neighbor Initiator Cost Metric | 0/8 | Routing metric of the adjacent cell which is initiating by current responder |

In Table 1, a vendor organizationally unique identifier (OUI) field may indicate a unique identifier for each vendor, and may be implemented with 24 bits, for example.

In Table 1, a UWB message ID field may indicate an ID of a corresponding UWB message. For example, the UWB message ID field may be implemented with 4 bits. For example, if a field value of the UWB message ID field is set to 0x07, the UWB message ID field may indicate that the corresponding UWB message is a TDoA message.

In Table 1, a reserved field may be a field reserved for future use. For example, the reserved field may be implemented with 4 bits.

In Table 1, a message control field may indicate configuration of the corresponding UWB message, and the message control field is described in detail in reference to Table 5, and, as such, a detailed description thereof is omitted herein.

In Table 1, a block index field may indicate a block index of a current ranging block (e.g., a ranging block in which an anchor transmitting the corresponding UWB message performs a ranging operation). For example, the block index field may be implemented with 16 bits.

In Table 1, a round index field may indicate a round index of a current ranging round (e.g., a ranging round in which the anchor transmitting the corresponding UWB message performs the ranging operation). For example, the round index field may be implemented with 16 bits.

In Table 1, a TX timestamp field may indicate a common time-based TX timestamp. For example, the TX timestamp field may be implemented with 64 bits. In an embodiment, a TX timestamp may be a TX timestamp for the UWB message.

In Table 1, a ranging device management list field may indicate N ranging device management list elements. The ranging device management list field may be implemented with 0 or 24*N bits according to a value of a ranging device management list length field included in the message control field to be described in Table 5 below. In an embodiment, N may indicate the number of ranging device management list elements. In an embodiment, a ranging device management list element may be expressed as shown in Table 2 below.

TABLE 2

| Parameter | Size (bits) | Notes |
| --- | --- | --- |
| Ranging Role | 1 | 0: Responder, 1: Initiator |
| Ranging Slot Index | 8 | Assigned slot |
| Scheduled UWB Message | 4 | ID of UWB message which will be conveyed in the slot |
| Stop Ranging | 1 | 0: Ranging will be continued 1: Ranging will be stopped |
| Reserved | 2 | Reserved for future use |

In Table 2, a ranging role field may indicate a ranging role of an anchor transmitting a corresponding UWB message. For example, the ranging role field may be implemented with 1 bit. If a field value of the ranging role field is, for example, 0, it may indicate that the ranging role of the anchor transmitting the corresponding UWB message is a responder. If the field value of the ranging role field is, for example, 1, it may indicate that the ranging role of the anchor transmitting the corresponding UWB message is an initiator.

In Table 2, a ranging slot index may indicate a slot index of a ranging slot allocated to the anchor transmitting the corresponding UWB message (e.g., a ranging slot in which the anchor transmitting the corresponding UWB message currently performs a ranging operation). For example, the ranging slot index field may be implemented with 8 bits.

In Table 2, an address field may indicate an address of a responder anchor. For example, the address field may be implemented with 16 bits.

In Table 2, a scheduled UWB message field may indicate an ID of a UWB message transferred in an allocated ranging slot. For example, the scheduled UWB message field may be implemented with 4 bits.

In Table 2, a stop ranging field may be implemented with, for example, 1 bit. For example, if a field value of the stop ranging field is 0, it may indicate that ranging will continue, and if the field value of the stop ranging field is 1, it may indicate that the ranging will be stopped.

In Table 2, a reserved field may be a field reserved for future use. For example, the reserved field may be implemented with 2 bits.

In Table 1, a clock frequency offset (CFO) field may indicate a clock frequency offset for an initiator anchor. The CFO field may be implemented with 0 or 16 bits according to a field value of a CFO present field included in the message control field to be described in Table 5 below.

In Table 1, a reply time list field may indicate M number of reply time list elements. The reply time list field may be implemented with 0 or 48*M bits according to a field value of a reply time list length field included in the message control field to be described in Table 5 below. M may indicate the number of reply time list elements.

In an embodiment, a reply time list element may be expressed as shown in Table 3 below.

TABLE 3

| Parameter | Size (bits) | Notes |
|---|---|---|
| Address | 16 | Address of the Anchor |
| Reply Time | 32 | Reply time as defined in IEEE Std 802.15.4z-2020 "Amendment: Enhanced Ultra Wideband 4 (UWB) Physical Layers (PHYs) and 5 Associated Ranging Techniques" |

In Table 3, an address field may indicate an address (e.g., a MAC address) of an anchor transmitting a corresponding UWB message, and may be implemented with, e.g., 16 bits.

In Table 3, a reply time field may be expressed as in Table 4 below.

TABLE 4

| Value of the phyLrpUwbFixedReplyTime attribute | Selected fixed reply time (RSTU, number of base chip periods) |
|---|---|
| FRT3 | 3 |
| FRT7 | 7 |
| FRT15 | 15 |
| FRT31 | 31 |

In Table 4, a value of the phyLrpUwbFixedReplyTime attribute may indicate a field value of a phyLrpUwbFixedReplyTime field, and may have a value of one of fixed reply time FRT3, FRT7, FRT15, or FRT31. In an embodiment, FRT corresponding to FRT3 may be 3, FRT corresponding to FRT7 may be 7, FRT corresponding to FRT15 may be 15, and FRT corresponding to FRT31 may be 31.

In an embodiment, if it is assumed that a transmitter and a receiver are synchronized, FRT of FRTx may correspond to equivalent time of FRTx+1 between active parts of the last received chip and the first transmitted chip. For example, an FRT value of FRT3 may correspond to four ranging scheduling time units (RSTUs). In an embodiment, an RSTU may be applied to specify ranging slot durations and various time intervals for scheduling of ranging activities and depend on a current physical (PHY) layer.

In Table 1, a responder reply time field may indicate reply time of a responder anchor in a common time base.

In Table 1, a cost metric field may indicate a routing metric for multi-hop time synchronization in multi-cell scenarios. In an embodiment, a cost metric may be a metric for establishing a time synchronization hierarchy or a tree within a multi-hop network topology for a DL TDoA. According to an embodiment, based on the cost metric, anchors may determine whether to depend on other anchors as time sources for overall time synchronization of the wireless communication network. In an embodiment, the cost metric may reflect a communication cost from one anchor to an initiator anchor (e.g., a reference anchor) which provides a service as a time reference for the wireless communication network. In an embodiment, the reference anchor providing the service as the time reference may have the lowest cost metric in the wireless communication network. In an embodiment, anchors may include cost metrics of the anchors themselves in DTMs such that that other anchors may join and synchronize to the wireless communication network, and participate in corresponding ranging rounds. In an embodiment, if an electronic device receives a DTM from another anchor having a cost metric greater than or equal to a current cost metric (e.g., a cost metric of a reference cell), the electronic device may not need to depend on the other anchor having the cost metric greater than or equal to the current cost metric for time synchronization. In an embodiment, if the electronic device receives a DTM from another anchor having a cost metric less than the current cost metric (e.g., the cost metric of the reference cell), the electronic device may select another reference anchor which operates as a time source in order to enhance (or decrease) a cost metric. In an embodiment, the cost metric field may be implemented with 0 or 8 bits according to a field value of a cost metric present field included in the message control field to be described in Table 5 below.

In Table 1, a neighbor round index length field may indicate a length of a neighbor round index field. In an embodiment, the neighbor round index length field may be implemented with 0 or 8 bits according to a field value of a neighbor round index present field included in the message control field to be described in Table 5 below.

In Table 1, a neighbor round index field may indicate a round index of a ranging round in which a corresponding responder anchor participates in a neighbor cell.

In an embodiment, a neighbor round index field may be implemented with 0 or 8*L bits according to a field value of a neighbor round index present field included in the message control field to be described in Table 5 below. In an embodiment, L may be the number of ranging rounds in which a current responder anchor participates as a responder anchor.

In Table 1, a neighbor initiator round index field may indicate a round index of a ranging round in which a current responder anchor, which is an initiator anchor in a neighbor cell, participates. In an embodiment, a responder anchor transmitting a corresponding UWB message may perform a ranging operation as a responder anchor in a corresponding cell, but may perform a ranging operation as an initiator anchor in a neighbor cell. In this case, the responder anchor transmitting the corresponding UWB message may set a field value of the neighbor initiator round index field to the round index of the ranging round in which the current responder anchor participates as the initiator anchor in the neighbor cell. In an embodiment, the neighbor initiator round index field may be implemented with 0 or 16 bits according to a field value of a neighbor initiator round index present field included in the message control field to be described in Table 5 below.

In Table 1, a neighbor initiator cost metric field may indicate a routing metric of a neighbor cell being initiated by a current responder anchor. In an embodiment, a responder anchor transmitting a corresponding UWB message may perform a ranging operation as a responder anchor in a corresponding cell, but may perform a ranging operation as an initiator anchor in a neighbor cell. In this case, the responder anchor transmitting the corresponding UWB message may set the number of hops by which a neighbor cell is away from a reference cell (e.g., a reference cell in which a master anchor exists) to a field value of the neighbor initiator cost metric field. In an embodiment, the neighbor initiator cost metric field may be implemented with 0 or 8 bits according to a field value of a neighbor initiator cost metric present field included in the message control field to be described in Table 5 below.

In an embodiment, the message control field in Table 1 may indicate configuration of a corresponding UWB message, and may be expressed as shown in Table 5 below.

TABLE 5

| Parameter | Size (bits) | Notes |
| --- | --- | --- |
| Ranging Device Management List Length | 4 | Number of elements in the ranging device management list field |
| Reply Time List Length | 4 | Number of elements in the Reply Time List field |
| CFO Present | 1 | Presence of CFO<br>0: CFO not present<br>1: CFO is present |
| Cost Metric Present | 1 | 0: Cost Metric not present<br>1: Cost Metric is present |
| Neighbor Round Index Present | 1 | 0: Neighbor Round Index Length & Neighbor Round Index not present<br>1: Neighbor Round Index Length & Neighbor Round Index is present |
| Neighbor Initiator Round Index Present | 1 | 0: Neighbor Initiator Round Index not present<br>1: Neighbor Initiator Round Index is present |
| Neighbor Initiator Cost Metric Present | 1 | 0: Neighbor Initiator Cost Metric not present<br>1: Neighbor Initiator Cost Metric is present |
| Reserved | 3 | Reserved for future use |

In Table 5, a ranging device management list length field may indicate the number of ranging device management elements included in the ranging device management list field in Table 1. For example, the ranging device management list length field may be implemented with 4 bits.

In Table 5, a reply time list length field may indicate the number of reply time list elements included in the reply time list field in Table 1. For example, the reply time list length field may be implemented with 4 bits.

In Table 5, a CFO present field may indicate whether the CFO field in Table 1 is present. For example, if a field value of the CFO present field is 0, it may indicate that the CFO field is not present, and if the field value of the CFO present field is 1, it may indicate that the CFO field is present.

In Table 5, a cost metric present field may indicate whether the cost metric field in Table 1 is present. For example, if a field value of the cost metric present field is 0, it may indicate that the cost metric field is not present, and if the field value of the cost metric present field is 1, it may indicate that the cost metric field is present.

In Table 5, a neighbor round index present field may indicate whether the neighbor round index length field and the neighbor round index field in Table 1 are present. For example, if a field value of the neighbor round index present field is 0, it may indicate that the neighbor round index length field and the neighbor round index field are not present, and if the field value of the neighbor round index present field is 1, it may indicate that the neighbor round index length field and the neighbor round index field are present.

In Table 5, a neighbor initiator round index present field may indicate whether the neighbor initiator round index field in Table 1 is present. For example, if a field value of the neighbor initiator round index present field is 0, it may indicate that the neighbor initiator round index field is not present, and if the field value of the neighbor initiator round index present field is 1, it may indicate that the neighbor initiator round index field is present.

In Table 5, a neighbor initiator cost metric present field may indicate whether the neighbor initiator cost metric field in Table 1 is present. For example, if a field value of the neighbor initiator cost metric present field is 0, it may indicate that the neighbor initiator cost metric field is not present, and if the field value of the neighbor initiator cost metric present field is 1, it may indicate that the neighbor initiator cost metric field is present.

In Table 5, a reserved field may be a field reserved for future use. For example, the reserved field may be implemented with 3 bits.

Referring back to FIG. 10, the mobile device 1001 which intends to detect the location based on the DL TDoA scheme may generate a ranging session. The ranging session may be a continuous ranging procedure specified by a certain initial set of parameters. In an embodiment, the ranging session may be related to one controller and at least one initiator. In an embodiment, the controller may be an ERDEV which controls the ranging session and defines ranging parameters by transmitting a ranging control message (RCM). In an embodiment, the controller may configure initial ranging parameters and update the initial ranging parameters during the ranging session.

After generating the ranging session, the mobile device 1001 may turn on a UWB RX chain to receive UWB messages and start performing a monitoring operation. In an embodiment, the mobile device 1001 may obtain parameters required for generating the ranging session through an app, in-band, or out-of-band (OOB). In an embodiment, a ranging round in which the mobile device 1001 first performs the monitoring operation may vary according to a time point at which the mobile device 1001 turns on the UWB RX chain, and in FIG. 10, it may be assumed that the ranging round in which the mobile device 1001 first performs the monitoring operation is a ranging round 9.

Alternatively or additionally, it may be assumed that the number of slave anchors in FIG. 10 is four as in FIG. 7. In this case, the wireless communication network may include the master anchor 1003, the first slave anchor 1005-1, the second slave anchor 1005-2, a third slave anchor, and a fourth slave anchor, and for convenience of illustration, the third slave anchor and the fourth slave anchor are not separately illustrated in FIG. 10.

If the mobile device 1001 fails to detect the location of the mobile device 1001 itself in the ranging round 9, the mobile device 1001 may perform the ranging operation again in another ranging round (e.g., a ranging round 0) while the UWB RX chain is turned on. If the mobile device 1001 is capable of detecting the location of the mobile device 1001 in the ranging round 0, the mobile device 1001 may not turn on the UWB RX chain any more in the corresponding ranging block, thereby minimizing current consumption.

In an embodiment, the mobile device 1001 may select an additional ranging round in which the ranging operation will be additionally performed in the corresponding ranging block, or select an active ranging round in the next ranging block based on information received in the ranging round 0. An operation in which the mobile device 1001 selects the active ranging round and the additional ranging round will be described in more detail in FIGS. 11A and 11B.

In an embodiment, in the ranging round 0, the mobile device 1001 may overhear an RIM, an RRM, and an RFM exchanged among the master anchor 1003 and the first slave anchor 1005-1, the second slave anchor 1005-2, the third slave anchor, and the fourth slave anchor. In an embodiment, the mobile device 1001 may select an active ranging round in the next ranging block based on an RRM which is received from each of the first slave anchor 1005-1, the second slave anchor 1005-2, the third slave anchor, and the fourth slave anchor.

In an embodiment, the RRM received from each of the first slave anchor 1005-1, the second slave anchor 1005-2, the third slave anchor, and the fourth slave anchor may have a format as described in Table 1, and each received RRM may include a neighbor initiator round index field and a neighbor initiator cost metric field.

As described in Table 1, the neighbor initiator round index field may indicate a round index set in a neighbor cell in which a responder anchor operating as a responder anchor in a corresponding cell participates as an initiator anchor. In an embodiment, the responder anchor transmitting a corresponding RRM may perform the ranging operation as the responder anchor in the corresponding cell, but may perform the ranging operation as the initiator anchor in the neighbor cell. In this case, the responder anchor transmitting the RRM may set a field value of the neighbor initiator round index field to a round index of the ranging round in which the responder anchor participates as the initiator anchor in the neighbor cell.

As described in Table 1, the neighbor initiator cost metric field may indicate a routing metric of a neighbor cell which is initiated by a current responder anchor. In an embodiment, a responder anchor transmitting a corresponding RRM may perform a ranging operation as the responder anchor in a corresponding cell, but may perform a ranging operation as an initiator anchor in a neighbor cell. In this case, the responder anchor transmitting the corresponding RRM may set the number of hops by which the neighbor cell is away from a reference cell to a field value of the neighbor initiator cost metric field.

In an embodiment, if the mobile device 1001 fails only to receive an RRM transmitted from the fourth slave anchor in a ranging round 0, the mobile device 1001 may recognize that neighbor cells in which a ranging operation is performed in a ranging round 1, a ranging round 2, and a ranging round 3 exist around the mobile device 1001 and may also recognize the number of hops of the neighbor cells based on RRMs received from the first slave anchor 1005-1, the second slave anchor 1005-2, and the third slave anchor. In an embodiment, the mobile device 1001 may recognize that the neighbor cells in which the ranging operation is performed in the ranging round 1, the ranging round 2, and the ranging round 3 exist around the mobile device 1001 and may also recognize the number of hops of the neighbor cells based on a neighbor initiator round index field and a neighbor initiator cost metric field included in the RRM received from each of the first slave anchor 1005-1, the second slave anchor 1005-2, and the third slave anchor.

In an embodiment, the mobile device 1001 may select a ranging round, e.g., an active ranging round, in which a ranging operation will be performed in the next ranging block based on the RRM received from each of the first slave anchor 1005-1, the second slave anchor 1005-2, and the third slave anchor. In an embodiment, a case that the mobile device 1001 selects the active ranging round in the next ranging block may mean the same as a case that the mobile device 1001 selects a cell which corresponds to the corresponding active ranging round. If the mobile device 1001 succeeds in detecting a location of the mobile device 1001 itself in a ranging round 0 in a corresponding ranging block, the mobile device 1001 may not perform a monitoring operation in other ranging rounds in the corresponding ranging block. Then, the ranging operation is performed in the selected active ranging round in the next ranging block. In FIG. 10, it may be assumed that the ranging round 0 is selected as the active ranging round in the next ranging block in the corresponding ranging block, and in this case, the mobile device 1001 may wake up only in a ranging round 0 from the next ranging block to turn on the UWB RX chain, and then overhear an RIM, an RRM, and an RFM exchanged between anchors.

In an embodiment, an anchor which operates as a responder anchor in a corresponding cell and operates also as the responder anchor in another cell also may include information (e.g., a neighbor round index field) related to a cell in which the anchor itself participates as the responder anchor in an RRM transmitted in the corresponding cell. In an embodiment, because the anchor which operates the responder anchor in the corresponding cell and operates also as the responder anchor in the other cell does not operate as an initiator anchor in the other cell, the anchor does not use a format of an RRM as described in Table 1 as it is and may transmit an RRM as shown in Table 6 below.

TABLE 6

| Parameter | Size (bits) | Notes |
|---|---|---|
| Vendor OUI | 24 | 0x5A18FF |
| UWB Message ID | 4 | 0x07 = TDoA Message |
| Reserved | 4 | Reserved for future use |
| Message Control | 16 | Configuration of the message |
| Block Index | 16 | Block index of the current ranging block |
| Round Index | 16 | Round index of the current ranging round |
| TX Timestamp | 64 | Transmission timestamp (in units of 15.65 ps) in the common time base |
| Ranging Device Management List | 0/24*N | N Ranging Device Management List Elements |
| CFO | 0/16 | Clock frequency offset with respect to initiator (in the unit of ppm) |
| Reply Time List | 0/48*M | M Reply Time List Elements |
| Responder Reply Time | 0/32 | Reply time of responder in the common time base |
| Cost Metric | 0/8 | Routing metric for multi-hop synchronization in multi-cell scenarios |
| Neighbor Round Index Length | 0/8 | Number of bytes for Neighbor Round index field |

In Table 6, a description of fields other than a neighbor round index length field is the same as a description of fields included in an RRM in Table 1, and, as such, a detailed description thereof is omitted herein.

In Table 6, the neighbor round index length field may be implemented with, for example, 3 bytes, and may indicate a round index of a ranging round in which a corresponding responder anchor participates in a neighbor cell. In an embodiment, the round index of the ranging round in which the corresponding responder anchor participates in the neighbor cell may be implemented in a form of a bitmap.

In an embodiment, if a bit value of a corresponding bit of each bitmap is set to, for example, 1, it may mean that a corresponding anchor participates as a responder anchor in a ranging round which corresponds to the bit set to 1. In an embodiment, if the bit value of the corresponding bit of each bitmap is set to, for example, 0, it may mean that the corresponding anchor does not participate as the responder anchor in a ranging round which corresponds to the bit set to 0. For example, if 20 ranging rounds are included in one ranging block, and a corresponding anchor participates as a responder anchor in a ranging round 0, a ranging round 5, a ranging round 7, and a ranging round 17, a neighbor round index expressed through the neighbor round index length field may be expressed in a form of a bitmap as shown in Table 7 below.

TABLE 7

| Neighbor Round Index Length | Neighbor Round Index |
|---|---|
| 24 | 0x850040 (100001010000000001000000b) |

In Table 7, a length of a neighbor round index length field may be implemented with, for example, 24 bits. For example, the number of ranging rounds included in one ranging block is 20, such that the remaining bits except for 20 bits which may correspond to ranging rounds among 24 bits may be padded with 0.

In an embodiment, in the wireless communication network, the mobile device 1001 may select a ranging round (e.g., an active ranging round) in which the mobile device 1001 participates in an arbitrary ranging block based on at least one of the following various parameters.

(1) Signal Quality

The mobile device 1001 may select an active ranging round based on signal quality. In an embodiment, the signal quality may signal quality of an RIM and an RFM received from an initiator anchor (e.g., the master anchor 1003), and RRMs received from responder anchors (e.g., the first slave anchor 1005-1 to the Nth slave anchor 1005-N). In an embodiment, the RRM used for the mobile device 1001 to select the active ranging round may be an RRM transmitted from an anchor which operates as a responder anchor in a corresponding cell (e.g., a serving cell) but operates as an initiator anchor in another cell (e.g., a neighbor cell). In FIG. 10, it may be assumed that each of the first slave anchor 1005-1 to the Nth slave anchor 1005-N operates as a responder anchor in the corresponding cell (e.g., the serving cell), but operates as an initiator anchor in the other cell (e.g., the neighbor cell).

In an embodiment, the signal quality may be, for example, at least one of a received signal strength indicator (RSSI), a channel quality indicator (CQI), a signal to noise ratio (SNR), a signal to interference ratio (SIR), a signal to interference and noise ratio (SINR), reference signal received power (RSRP), or reference signal received quality (RSRQ). In an embodiment, at least one of the RSSI, the CQI, the SNR, the SIR, the SINR, the RSRP, or the RSRQ is presented as an example of the signal quality, but the signal quality is not limited thereto.

The mobile device 1001 may measure signal quality for each of the RIM and the RFM received from the master anchor 1003, and the RRMs received from the first slave anchor 1005-1 to the Nth slave anchor 1005-N. The mobile device 1001 may exclude ranging rounds related to an RIM, an RFM, and RRMs having signal quality less than set threshold signal quality from candidate active ranging rounds for an active ranging round based on the measured signal quality. For example, if an RSSI is set as signal quality used for selecting the active ranging round, ranging rounds related to an RIM, an RFM, and RRMs which have an RSSI less than a threshold RSSI among the RIM, the RFM, and the RRMs received by the mobile device 1001 may be excluded from the candidate active ranging rounds.

The mobile device 1001 may allocate a weight to a corresponding ranging round in descending order of signal quality thereof for the RIM and the RFM received from the master anchor 1003, and the RRMs received from the first slave anchor 1005-1 to the Nth slave anchor 1005-N, and select an active ranging round based on the weight allocated to each ranging round. For example, if the RSSI is set as the signal quality used for selecting the active ranging round, the mobile device 1001 may allocate a large weight to a corresponding ranging round in descending order of value thereof for RSSIs of the RIM, the RFM, and the RRMs, and select a ranging round having the largest weight as the active ranging round based on the allocated weights. An example of a scheme of selecting the active ranging round based on the weights which are allocated to the ranging rounds based on the RSSIs of the RIM and the RFM received from the master anchor 1003, and the RRMs received from the first slave anchor 1005-1 to the Nth slave anchor 1005-N will be described below.

First, the mobile device 1001 may divide an RSSI value into a plurality of ranges and set a weight for each of the plurality of ranges. For example, the mobile device 1001 may set a weight 5 to a range whose RSSI value is −60 dB or more, set a weight 3 for a range whose RSSI value is approximately −60 dB to −70 dB, set a weight 2 for a range whose RSSI value is approximately −70 dB to −80 dB, and set a weight 1 for a range whose RSSI value is approximately −80 dB to −90 dB. If a weight is not set for a range whose RSSI value is −90 dB or less, and there is another RRM which the mobile device 1001 may use, a ranging round, whose RSSI value is −90 dB or less, which is related to a DTM (e.g., at least one of an RIM, an RFM, or an RRM), may be excluded from candidate active ranging rounds. The mobile device 1001 may select, as an active ranging round in the next ranging block, a ranging round having the largest weight among weights which are allocated for ranging rounds related to the RIM and the RFM received from the master anchor 1003, and the RRMs received from the first slave anchor 1005-1 to the Nth slave anchor 1005-N.

In a DL TDoA scheme, if the mobile device 1001 does not receive an RIM and an RFM transmitted by the master anchor 1003 in a corresponding cell, the mobile device 1001 may not detect a location of the mobile device 1001 itself even though the mobile device 1001 has normally received all of RRMs transmitted from the first slave anchor 1005-1 to the Nth slave anchor 1005-N. As such, whether a signal (e.g., an RIM and an RFM) may be normally received from the master anchor 1003 may act as an important factor in detecting a location of the mobile device 1001. Accordingly, signal quality by which a success rate of a signal in a current channel situation of the mobile device 1001 may be predicted may be an important factor in selecting an active ranging round.

According to an embodiment, the mobile device 1001 may select candidate active ranging rounds based on signal strength of the master anchor 1003 and a designated number (e.g., 3 in a 2D or 4 in a 3D) of responder anchors. For example, the mobile device 1001 may select the candidate active ranging rounds by setting a weight for only the signal strength of the master anchor 1003 and the designated number of responder anchors.

(2) Path Quality

The mobile device 1001 may select an active ranging round based on path quality. In an embodiment, the path quality may be path quality of an RIM and an RFM received from an initiator anchor (e.g., the master anchor 1003), and RRMs received from responder anchors (e.g., the first slave anchor 1005-1 to the Nth slave anchor 1005-N). In an embodiment, an RRM used by the mobile device 1001 to select an active ranging round may be an RRM transmitted from an anchor which operates as a responder anchor in a current cell but operates as an initiator anchor in another cell (e.g., a neighbor cell).

In an embodiment, the path quality may be, for example, at least one of an RSSI, a CQI, an SNR, an SIR, an SINR, RSRP, or RSRQ. The mobile device 1001 may measure path quality for each of the RIM and the RFM received from the master anchor 1003, and the RRMs received from the first slave anchor 1005-1 to the Nth slave anchor 1005-N, and select an active ranging round based on the measured path quality. In an embodiment, the higher the first path quality (e.g., a first path SNR) is, the higher a probability that a corresponding RIM, RFM, and RRM are first path signals not multi-path signals according to reflection may be. The mobile device 1001 may detect a TX timestamp upon performing a ranging operation in a ranging round related to the RIM, the RFM, and the RRM which are the first path signals, such that a probability that the mobile device 1001 may detect a location of the mobile device 1001 may be high.

In an embodiment, the mobile device 1001 may allocate a weight to a corresponding ranging round in descending order of first path quality of the RIM and the RFM received from the master anchor 1003, and the RRMs received from the first slave anchor 1005-1 to the Nth slave anchor 1005-N, and select an active ranging round based on the weights allocated to the ranging rounds. For example, if path quality used for selecting an active ranging round is set to an SNR, the mobile device 1001 may allocate a large weight to a corresponding ranging round in descending order of first path SNR for the RIM and the RFM received from the master anchor 1003, and the RRMs received from the first slave anchor 1005-1 to the Nth slave anchor 1005-N, and select a ranging round which has the largest weight as the active ranging round based on the allocated weights.

An example of a scheme of selecting an active ranging round based on weights allocated to corresponding ranging rounds based on first path SNRs of an RIM and an RFM received from the master anchor 1003, and RRMs received from the first slave anchor 1005-1 to the Nth slave anchor 1005-N will be described as follows.

First, the mobile device 1001 may divide a first path SNR value into a plurality of ranges, and may set a weight for each of the plurality of ranges. For example, the mobile device 1001 may set a weight 3 for a range whose first path SNR value is 30 dB or more, set a weight 2 for a range whose first path SNR value is approximately 25 dB to 30 dB, and set a weight 1 for a range whose first path SNR value is approximately 20 dB to 25 dB. The mobile device 1001 may select, as an active ranging round in the next ranging block, a ranging round which has the largest weight among weights which are allocated to corresponding ranging rounds based on an RIM and an RFM received from the master anchor 1003, and RRMs received from the first slave anchor 1005-1 to the Nth slave anchor 1005-N.

(3) FoV

The mobile device 1001 may select an active ranging round based on an FoV. In an embodiment, the FoV may be used for determining whether an obstacle exists in front of the mobile device 1001. In an embodiment, an RRM used for the mobile device 1001 to select an active ranging round may be an RRM transmitted from an anchor which operates as a responder anchor in a corresponding cell (e.g., a serving cell) but operates as an initiator anchor in another cell (e.g., a neighbor cell).

In an embodiment, via a combination of a directional antenna and/or an omni-directional antenna (e.g., a combination of a laser direct structuring (LDS) antenna and/or a patch antenna), the mobile device 1001 may receive an RIM and an RFM from the master anchor 1003, and receive RRMs from the first slave anchor 1005-1 to the Nth slave anchor 1005-N. In an embodiment, via the combination of the LDS antenna and/or the patch antenna, the mobile device 1001 may receive the RIM and the RFM from the master anchor 1003, and receive the RRMs from the first slave anchor 1005-1 to the Nth slave anchor 1005-N. In an embodiment, the mobile device 1001 may receive a DTM (e.g., at least one of an RIM, an RFM, or an RRM) transmitted from the same anchor via the LDS antenna and/or the patch antenna, and determine whether a cell related to the corresponding DTM exists within an FoV based on a difference between a reception (Rx) timestamp of the DTM received via the LDS antenna and an Rx timestamp of the DTM received via the patch antenna. In an embodiment, if the difference between the Rx timestamp of the DTM received via the LDS antenna and the Rx timestamp of the DTM received via the patch antenna exceeds a threshold time, it may be considered that a first path signal has not been normally received via the directional antenna located on the rear of the mobile device 1001, such that the mobile device 1001 may determine a state of an anchor which transmits the corresponding DTM as a non-FoV state in which the anchor does not exist within the FoV.

As described in a scheme of determining an active ranging round based on signal quality, if the mobile device 1001 does not receive the RIM and the RFM from the master anchor 1003, the mobile device 1001 may not detect a location of the mobile device 1001 itself, such that a ranging operation in a corresponding ranging round may be meaningless. Accordingly, if the mobile device 1001 selects an active ranging round based on an FoV, a ranging round related to an anchor which is in a non-FoV state may be excluded from candidate active ranging rounds. If it is determined that a specific anchor is in an FoV state based on the RIM and the RFM received from the master anchor 1003, and the RRMs received from the first slave anchor 1005-1 to the Nth slave anchor 1005-N, the mobile device 1001 may allocate a set weight (e.g., a weight 2) to a ranging round related to the anchor which is in the FoV state.

In an embodiment, for preventing a case that the mobile device 1001 may not receive the RIM and the RFM from the master anchor 1003, the active ranging round may be selected in consideration of at least one of a distance between the mobile device 1001 and the master anchor 1003, or a location of the mobile device 1001 in a serving cell.

In an embodiment, for preventing the case that the mobile device 1001 may not receive the RIM and the RFM from the master anchor 1003, the active ranging round may be selected in consideration of a case that a user of the mobile device 1001 blocks between the mobile device 1001 and the master anchor 1003, or an obstacle exists between the mobile device 1001 and the master anchor 1003.

(4) LoS

In an embodiment, the mobile device 1001 may select an active ranging round based on an LoS. In an embodiment, the LoS may be used for checking whether an obstacle exists between the mobile device 1001 and an anchor.

In an embodiment, an RRM used for the mobile device 1001 to select the active ranging round may be an RRM transmitted by an anchor which operates as a responder anchor in a corresponding cell (e.g., a serving cell) but operates as an initiator anchor in another cell (e.g., a neighbor cell).

In an embodiment, the mobile device 1001 may receive an RIM and an RFM from a master anchor 1003, and receive RRMs from a first slave anchor 1005-1 to an Nth slave anchor 1005-N. In an embodiment, the mobile device 1001 may determine whether anchors related to the corresponding RIM, RFM, and RRMs exist on the LoS based on the received RIM, RFM, and RRMs.

As described in a scheme of determining an active ranging round based on signal quality, if the mobile device 1001 does not receive the RIM and the RFM from the master anchor 1003, the mobile device 1001 may not detect a location of the mobile device 1001 itself, and, as a result, a ranging operation in a corresponding ranging round may be meaningless. Accordingly, if the mobile device 1001 selects an active ranging round based on an LoS, a ranging round related to an anchor which is in a state (e.g., a non-LoS state) in which the mobile device 1001 does not exist on the LoS may be excluded from candidate active ranging rounds. If it is determined that, based on the received RIM, RFM, and RRMs, anchors related to the corresponding RIM, RFM, and RRMs are in an LoS state, the mobile device 1001 may allocate a set weight (e.g., a weight 1) to a ranging round related to the anchors which are determined to be in the LoS state.

In an embodiment, the LoS may be detected at a UWB chip level.

(5) Neighbor Initiator Cost Metric

In an embodiment, the mobile device 1001 may select an active ranging round based on a neighbor initiator cost metric. In an embodiment, an RRM used for the mobile device 1001 to select the active ranging round may be an RRM transmitted by an anchor which operates as a responder anchor in a corresponding cell (e.g., a serving cell) but operates as an initiator anchor in another cell (e.g., a neighbor cell).

In an embodiment, the mobile device 1001 may receive an RRM from each of the first slave anchor 1005-1 to the Nth slave anchor 1005-N. In an embodiment, the mobile device 1001 may select a ranging round related to a neighbor initiator cost metric having a minimum value among neighbor initiator cost metrics included in the received RRMs as the active ranging round.

(6) Combination of Signal Quality, Path Quality, an FoV, an LoS, and/or a Neighbor Initiator Cost Metric In an embodiment, the mobile device 1001 may select an active ranging round based on a combination of at least two of signal quality, path quality, an FoV, an LoS, or a neighbor initiator cost metric. In FIG. 10, it may be assumed that the mobile device 1001 selects the active ranging round based on a combination of the signal quality, the path quality, the FoV, the LoS, and/or the neighbor initiator cost metric. In an embodiment, an RRM used for the mobile device 1001 to select the active ranging round may be an RRM transmitted by an anchor which operates as a responder anchor in a corresponding cell (e.g., a serving cell) but operates as an initiator anchor in another cell (e.g., a neighbor cell). In an embodiment, it may be assumed that the signal quality is, for example, an RSSI.

In an embodiment, the mobile device 1001 may divide an RSSI value into a plurality of ranges and set a weight for each of the plurality of ranges. For example, the mobile device 1001 may set a weight 5 to a range whose RSSI value is −60 dB or more, set a weight 3 for a range whose RSSI value is approximately −60 dB to −70 dB, set a weight 2 for a range whose RSSI value is approximately −70 dB to −80 dB, and set a weight 1 for a range whose RSSI value is approximately −80 dB to −90 dB. A weight may not be set for a range whose RSSI value is −90 dB or less.

In an embodiment, for example, the mobile device 1001 may set a weight 3 for a range whose first path SNR value is 30 dB or more, set a weight 2 for a range whose first path SNR value is approximately 25 dB to 30 dB, and set a weight 1 for a range whose first path SNR value is approximately 20 dB to 25 dB.

In an embodiment, for example, if it is determined that a corresponding anchor is in an FoV state based on an RIM and an RFM received from the master anchor 1003, and RRMs received from the first slave anchor 1005-1 to the Nth slave anchor 1005-N, the mobile device 1001 may allocate a weight 2 to a ranging round related to the anchor which is in the FoV state.

In an embodiment, for example, if it is determined that a corresponding anchor is in an LoS state based on an RIM and an RFM received from the master anchor 1003, and RRMs received from the first slave anchor 1005-1 to the Nth slave anchor 1005-N, the mobile device 1001 may allocate a weight 2 to a ranging round related to the anchor which is in the LoS state.

Upon receiving a DTM (e.g., at least one of an RIM, an RFM, and an RRM) after setting weights as above for each of an RSSI, an SNR, an FoV, and an LoS, the mobile device 1001 may obtain a weight for an active ranging round related to the corresponding DTM based on each of an RSSI, an SNR, an FoV, and an LoS for the corresponding DTM, and select a ranging round having a maximum weight among ranging rounds as the active ranging round. In an embodiment, for a DTM whose RSSI value is −90 dB or less, the mobile device 1001 may exclude a ranging round related to the corresponding DTM from candidate active ranging rounds even though a sum of weights which are allocated to the related ranging round based on the SNR, the FoV, and the LoS is greater than or equal to a threshold weight. In an embodiment, if the number of ranging rounds having the maximum weight is two or more, the mobile device 1001 may select a ranging round related to an RRM whose neighbor initiator cost metric is relatively small as the active ranging round.

In an embodiment, a case that the mobile device 1001 selects an active ranging round based on at least one of signal quality, path quality, an FoV, an LoS, or a neighbor initiator cost metric, and a case that the mobile device 1001 selects an active ranging round based on a combination of at least two of signal quality, path quality, an FoV, an LoS, or a neighbor initiator cost metric have been described, but parameters used for the mobile device 1001 to select an active ranging round are not limited thereto.

In an embodiment, even though the mobile device 1001 succeeds in detecting a location of the mobile device 1001 itself in an active ranging round in a corresponding ranging block, the mobile device 1001 may select an additional ranging round in the corresponding ranging block according to a state of a corresponding cell (e.g., a serving cell) and additionally perform a ranging operation in the additional ranging round. For example, if a weight for the active ranging round obtained based on a combination of signal quality, path quality, an FoV, an LoS, and/or a neighbor initiator cost metric is less than a set threshold, or if the number of received RRMs is less than or equal to a set number (e.g., three), the mobile device 1001 may determine that a state of a cell is a bad state. If a state of a cell in which the mobile device has succeeded in detecting a location of the mobile device 1001 is the bad state, the mobile device 1001 may perform a ranging operation in any one of ranging rounds which correspond to neighbor initiator round indexes included in the received RRMs. In an embodiment, if the state of the cell is not the bad state, it may be assumed that the state of the cell is a good state. In an embodiment, the good state may be a case that a weight for an active ranging round which is obtained based on a combination of signal quality, path quality, an FoV, an LoS, and/or a neighbor initiator cost metric is greater than or equal to a set threshold, or the number of received RRMs is greater than a set number (e.g., three).

Meanwhile, if the mobile device 1001 does not detect a location of the mobile device 1001 itself because the mobile device 1001 fails to normally receive an RIM, an RFM, and RRMs in an active ranging round, the mobile device 1001 may consider to move to a cell which corresponds to another ranging round other than the corresponding active ranging round. In an embodiment, the case that the mobile device 1001 may not detect the location of the mobile device 1001 itself in the active ranging round may include the following two cases:

(1) A case in that the mobile device 1001 may not receive only an RIM and an RFM from a master anchor; and
(2) A case in that the mobile device 1001 does not receive any DTM from all anchors (e.g., does not receive an RIM and an RFM from the master anchor 1003, and does not receive RRMs from all of the first slave anchor 1005-1 to the Nth slave anchor 1005-N).

In an embodiment, if the mobile device 1001 does not receive only the RIM and the RFM from the master anchor 1003, the mobile device 1001 may receive the RRMs from the first slave anchor 1005-1 to the Nth slave anchor 1005-N, thereby selecting an active ranging round based on the received RRMs. The operation in which the mobile device 1001 selects the active ranging round based on the received RRMs has been described above, and, as such, a detailed description thereof is omitted herein. In an embodiment, the mobile device 1001 may select one or a plurality of additional ranging rounds. In an embodiment, if a round index of an active ranging round in which the mobile device 1001 fails to detect a location of the mobile device 1001 is smaller than a round index of a newly selected active ranging round, the mobile device 1001 may perform a ranging operation in the newly selected active ranging round in a corresponding ranging block. In an embodiment, if the round index of the active ranging round in which the mobile device 1001 fails to detect the location of the mobile device 1001 is larger than the round index of the newly selected active ranging round, the mobile device 1001 may perform a ranging operation in the newly selected active ranging round in the next ranging block.

In an embodiment, if the mobile device 1001 does not receive any DTM (e.g., an RIM, an RFM, and an RRM) from all anchors (e.g., the master anchor 1003, and the first slave anchor 1005-1 to the Nth slave anchor 1005-N), the mobile device 1001 may need to turn on a UWB RX chain to continuously perform a monitoring operation on ranging rounds within a corresponding ranging block, similarly to a case that the mobile device 1001 first performs a ranging operation.

In an embodiment, if the mobile device 1001 does not receive any DTM (e.g., the RIM, the RFM, and the RRM) from all anchors (e.g., the master anchor 1003, and the first slave anchor 1005-1 to the Nth slave anchor 1005-N), the mobile device 1001 may turn on the UWB RX chain to perform a monitoring operation in only ranging rounds which correspond to neighbor initiator round indexes included in RRMs received in a ranging block immediately before the corresponding ranging block. While performing a ranging operation for the ranging rounds which correspond to the neighbor initiator round indexes included in the RRMs received in the ranging block immediately before the corresponding ranging block, the mobile device 1001 may not turn on the UWB RX chain any more upon detecting a location of the mobile device 1001 in any one ranging round.

If the mobile device 1001 turns on the UWB RX chain to perform the monitoring operation on only the ranging rounds which correspond to the neighbor initiator round indexes included in the RRMs received in the ranging block immediately before the corresponding ranging block, and does not any DTM from all anchors in the corresponding ranging rounds, the mobile device 1001 may need to turn on the UWB RX chain to continuously perform a monitoring operation for ranging rounds within the corresponding ranging block, similarly to the case that the mobile device 1001 first performs the ranging operation.

In an embodiment, in the wireless communication network, if the mobile device 1001 is capable of obtaining location information of anchors which exist in neighbor cells or anchors which exist on a path on which the mobile device 1001 will move in advance, the mobile device 1001 may select an additional ranging round in real time or every set period, and perform a ranging operation in the selected additional ranging round based on the location information of the anchors which exist in the neighbor cells or the anchors which exist on the path on which the mobile device 1001 will move. In an embodiment, the additional ranging round may be a ranging round in which the mobile device 1001 will additionally perform a ranging operation in addition to an active ranging round in a specific ranging block.

In an embodiment, the location information of the anchors which exist in the neighbor cells or the anchors which exist on the path on which the mobile device 1001 will move may be used for selecting the additional ranging round at a UWB chip level. For example, while the mobile device 1001 is performing a ranging operation in an active ranging round (e.g., a ranging round 5) in a corresponding ranging block, there may be a situation in which the mobile device 1001 is close to coverage of cells which use a round index 3 and a round index 4. In this situation, if the mobile device 1001 fails the ranging operation in the ranging round 5 (for example, if mobile device 1001 fails to detect a location of the mobile device 1001 itself), the mobile device 1001 may preferentially consider a ranging round 3 and a ranging round 4 in selecting an active ranging round. In an embodiment, the mobile device 1001 may also select the ranging round 3 and the ranging round 4 as additional ranging rounds and perform the ranging operation on the selected additional ranging rounds even though the ranging operation has been successful in the ranging round 5. For example, the mobile device 1001 may also select the ranging round 3 and the ranging round 4 as the additional ranging rounds based on a combination of signal quality, path quality, an FoV, an LoS, and/or a neighbor initiator cost metric of a DTM (e.g., an RIM, an RFM, and an RRM) received in the ranging round 5, and perform the ranging operation on the selected additional ranging rounds.

According to an embodiment, it may be efficient to perform a ranging operation in one ranging round in one ranging block in a wireless communication network, but if necessary, the ranging operation may be performed in two or more ranging rounds. For example, a case may occur that the mobile device 1001 fails in a ranging operation in an active ranging round, or the mobile device 1001 moves to a cell of a master anchor which does not participate in the ranging operation as a responder anchor in the active ranging round. In order to prepare for these cases, the mobile device 1001 may also perform the ranging operation in at least one ranging round, e.g., an additional ranging round, which is set in neighbor cells as well as an active ranging round (e.g., a ranging round set in a serving cell) selected in a corresponding ranging block. The mobile device 1001 may perform the ranging operation every set period (e.g., three ranging blocks or five ranging blocks) for the additional ranging round other than the active ranging round.

In an embodiment, if a sensor hub is directly connected to a UWB chip of the mobile device 1001, the mobile device 1001 may determine a monitoring period for an additional ranging round based on sensor information detected via the sensor hub. In an embodiment, a moving speed of the mobile device 1001 may be detected based on the detected sensor information, and the mobile device 1001 may determine the monitoring period for the additional ranging round based on the detected moving speed. For example, if a speed of the mobile device 1001 is greater than or equal to a first threshold speed, the monitoring period for the additional ranging round may be shortened, if the speed of the mobile device 1001 is greater than or equal to a second threshold speed and less than the first threshold speed, the monitoring period for the additional ranging round may be maintained, and if the speed of the mobile device 1001 is less than the second threshold speed, the monitoring period for the additional ranging round may be increased. In an embodiment, if the speed of the mobile device 1001 is less than the second threshold speed, the monitoring operation for the additional ranging round may not be performed.

Figure 11A:
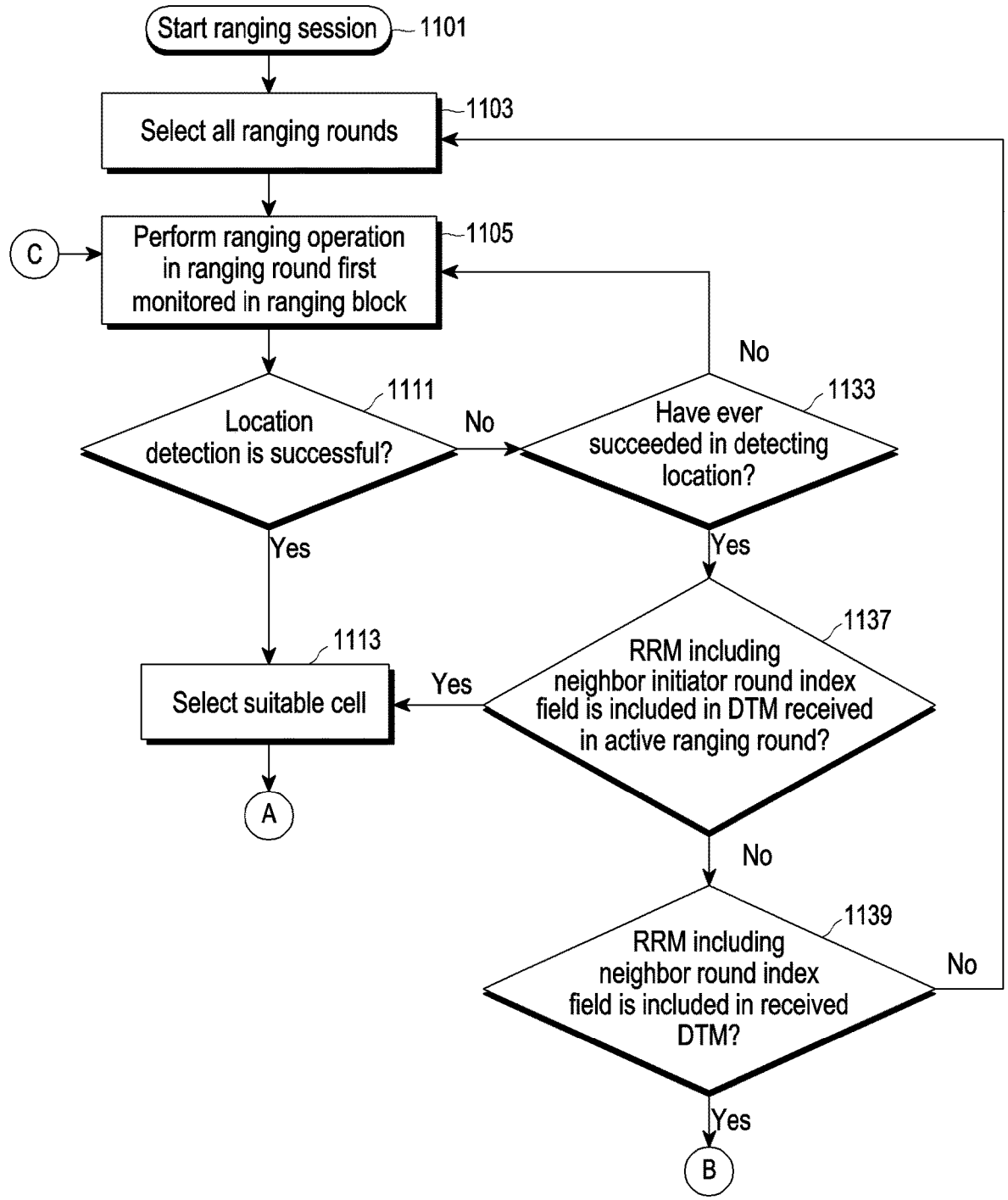
FIGS. 11A and 11B are diagrams schematically illustrating an example of an operating process of an electronic device in a wireless communication network according to various embodiments.
Figure 11B:
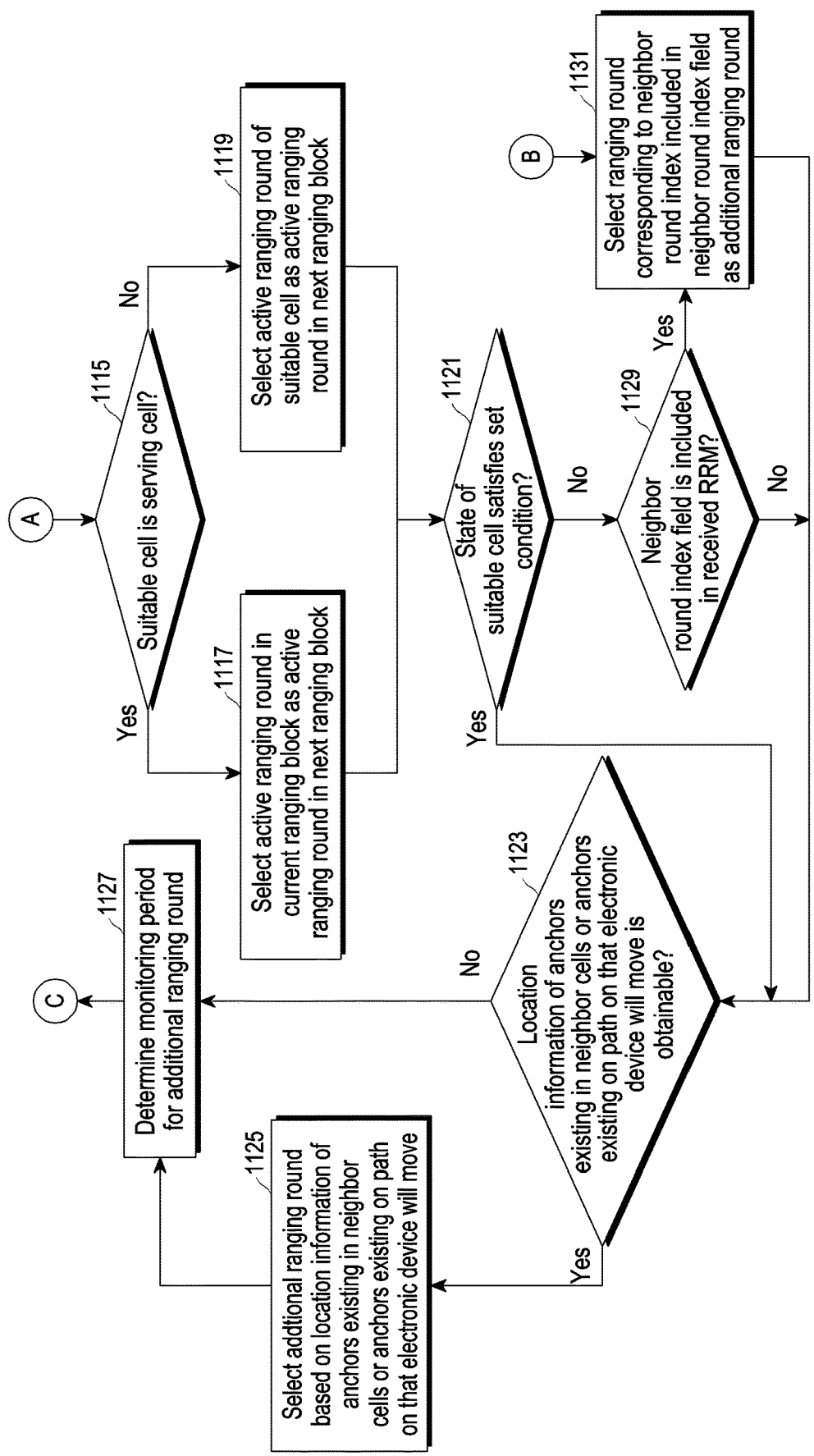

FIGS. 11A and 11B are diagrams schematically illustrating an example of an operating process of an electronic device in a wireless communication network according to various embodiments.

Referring to FIGS. 11A and 11B, in a wireless communication network, e.g., a UWB network, an electronic device (e.g., an electronic device 101 of FIG. 1, a mobile device 301 of FIG. 3, or a mobile device 1001 of FIG. 10) may start a ranging session in operation 1101. In operation 1103, the electronic device may select all ranging rounds. In an embodiment, the electronic device first starts a monitoring operation, and, as such, the electronic device may select all ranging rounds within a ranging block in a state in which a UWB RX chain is turned on. In operation 1105, the electronic device may perform a ranging operation in a ranging round which is first monitored in the corresponding ranging block.

In operation 1111, the electronic device may check whether the electronic device has succeeded in detecting a location of the electronic device. A scheme in which the electronic device detects the location of the electronic device itself has been described in reference to FIGS. 5 and 6, and, as such, a detailed description thereof is omitted herein. If the electronic device succeeds in detecting the location of the electronic device itself as a result of the check in operation 1111, the electronic device may select a suitable cell for the electronic device based on RRMs including a neighbor initiator round index among an RIM and an RFM received from an initiator anchor and RRMs received from a responder anchor in operation 1113. A scheme in which the electronic device selects the suitable cell for the electronic device based on the RRMs including the neighbor initiator round index field among the RIM and the RFM received from the initiator anchor and the RRMs received from the responder anchor has been described in reference to FIG. 10, and, as such, a detailed description thereof is omitted herein.

In operation 1115, the electronic device may check whether the suitable cell selected for the electronic device is a current cell (e.g., a serving cell). As a result of the check, if the suitable cell selected for the electronic device is the serving cell, the electronic device may select an active ranging round in the next ranging block to be the same as an active ranging round in a corresponding ranging block in operation 1117.

As a result of the check in operation 1115, if the suitable cell selected for the electronic device is not the serving cell, the electronic device may select the active ranging round in the next ranging block as a ranging round for the suitable cell selected for the electronic device in operation 1119.

In operation 1121, the electronic device selecting the active ranging round may check whether a state of the suitable cell selected for the electronic device satisfies a set condition. In an embodiment, the state of the cell satisfying the set condition may be a good state. In an embodiment, the good state may be a case that a weight which is obtained for a corresponding cell based on a combination of signal quality, path quality, an FoV, an LoS, and/or a neighbor initiator cost metric is greater than or equal to a set threshold, or the number of received RRMs is greater than a set number (e.g., three). The good state has been described in further detail in reference to FIG. 10, and, as such, a detailed description thereof is omitted herein.

As a result of the check in operation 1121, if the state of the suitable cell selected for the electronic device satisfies the set condition (e.g., if the state of the suitable cell selected for the electronic device is the good state), the electronic device may check whether location information of anchors which exist in neighbor cells or anchors which exist on a path on which the electronic device will move is obtainable in operation 1123. In an embodiment, the electronic device may previously obtain the location information of the anchors existing in the neighbor cells or the anchors existing on the path on which the electronic device will move through a higher layer (e.g., a navigation app) or a server.

As a result of the check in operation 1123, if the location information of the anchors existing in the neighbor cells or the anchors existing on the path on which the electronic device will move is obtainable, the electronic device may select an additional ranging round based on the location information of the anchors existing in the neighbor cells or the anchors existing on the path on which the electronic device will move in operation 1125. An operation in which the electronic device selects the additional ranging round has been described in reference to FIG. 10, and, as such, a detailed description thereof is omitted herein. As a result of the check in operation 1123, if the location information of the anchors existing in the neighbor cells or the anchors existing on the path on which the electronic device will move is not obtainable, the electronic device may determine a monitoring period for the additional ranging round in operation 1127.

The electronic device selecting the additional ranging round in operation 1125 may determine a monitoring period for the additional ranging round in operation 1127. In an embodiment, the electronic device may determine the monitoring period for the additional ranging round based on a moving speed of the electronic device. In an embodiment, if a sensor hub is directly connected to a UWB chip of the electronic device, the electronic device may determine the monitoring period for the additional ranging round based on sensor information detected via the sensor hub. In an embodiment, the moving speed of the electronic device may be detected based on the detected sensor information, and the electronic device may determine the monitoring period for the additional ranging round based on the detected moving speed. For example, if a speed of the mobile device is greater than or equal to a first threshold speed, the monitoring period for the additional ranging round may be shortened, if the speed of the mobile device is greater than or equal to a second threshold speed and less than the first threshold speed, the monitoring period for the additional ranging round may be maintained, and if the speed of the mobile device is less than the second threshold speed, the monitoring period for the additional ranging round may be increased. In an embodiment, if the speed of the electronic device is less than the second threshold speed, a monitoring operation for the additional ranging round may not be performed. For example, if the speed of the electronic device is less than the second threshold speed, a ranging operation may not be performed for some additional ranging rounds or the ranging operation may be performed only in a designated ranging block. As a result of the check in operation 1121, if the state of the cell corresponding to the active ranging round does not satisfy the set condition (e.g., if the state of the suitable cell selected for the electronic device is a bad state), the electronic device may check whether a neighbor round index field is included in the received RRMs in operation 1129. In an embodiment, if a weight which is obtained for the corresponding cell based on a combination of signal quality, path quality, an FoV, an LoS, and/or a neighbor initiator cost metric is less than a set threshold, or the number of received RRMs is less than or equal to a set number (e.g., three), the electronic device may determine that the state of the cell is the bad state. The bad state has been described in reference to FIG. 10, and, as such, a detailed description of the bad state is omitted herein. As a result of the check in operation 1129, if the neighbor round index field is not included in the received RRMs, the electronic device may operate as described in operation 1123.

As a result of the check in operation 1129, if the neighbor round index field is included in the received RRMs, the electronic device may select, as the additional ranging round, a ranging round which corresponds to a neighbor round index included in the neighbor round index field of the received RRMs in operation 1131. An operation in which the electronic device selects the additional ranging round based on the neighbor round index included in the neighbor round index field of the received RRMs has been described in reference to FIG. 10, and, as such, a detailed description thereof is omitted herein.

As a result of the check in operation 1111, if the electronic device fails to detect the location of the electronic device, in operation 1133, the electronic device may check whether the electronic device has previously (e.g., in a previous rounding block succeeded in detecting the location. As a result of the check, if the electronic device has previously succeeded in detecting the location, in operation 1137, the electronic device may check whether an RRM including a neighbor initiator round index field is included in a DTM (e.g., at least one of an RIM, an RRM, or an RFM) received in the corresponding active ranging round. As a result of the check, if the RRM including the neighbor initiator round index field is included in the received DTM, the electronic device may operate as described in operation 1113.

As a result of the check in operation 1137, if the RRM including the neighbor initiator round index field is not included in the received DTM, the electronic device may check whether an RRM including a neighbor round index is included in the received DTM in operation 1139. As a result of the check, if the RRM including the neighbor round index field is included in the received DTM, the electronic device may operate as described in operation 1131. As a result of the check in operation 1139, if the RRM including the neighbor round index field is not included in the received DTM, the electronic device may operate as described in operation 1103.

Meanwhile, although FIGS. 11A and 11B illustrate an example of an operating process of an electronic device in a wireless communication network according to various embodiments, various modifications may be made to FIGS. 11A and 11B. For example, although consecutive steps are illustrated in FIGS. 11A and 11B, the steps described in FIGS. 11A and 11B may overlap, occur in parallel, occur in a different order, or occur multiple times.

Figure 12:
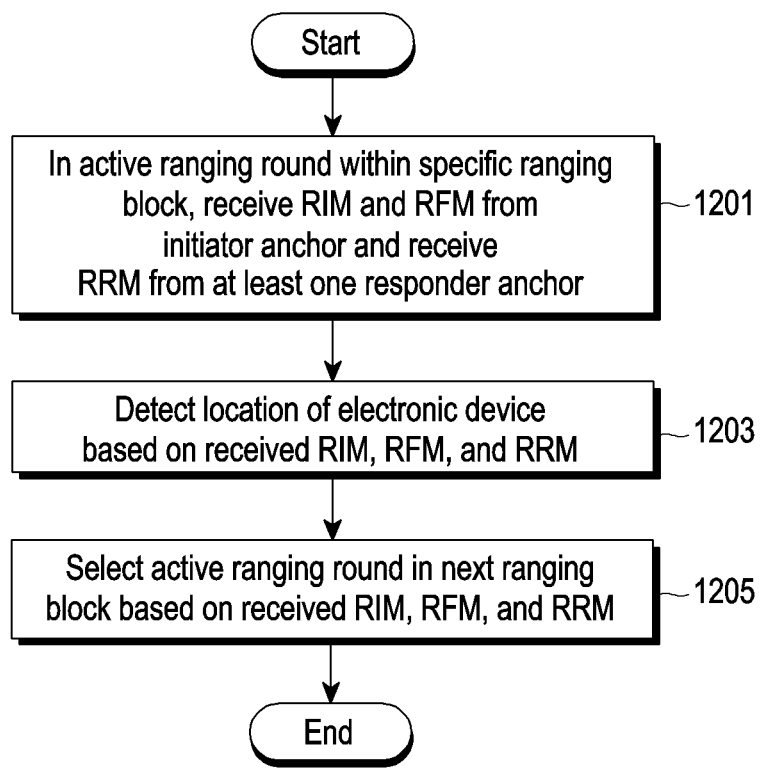
FIG. 12 is a diagram schematically illustrating another example of an operating process of an electronic device in a wireless communication network according to various embodiments.

FIG. 12 is a diagram schematically illustrating another example of an operating process of an electronic device in a wireless communication network according to various embodiments.

Referring to FIG. 12, in a wireless communication network, e.g., a UWB network, an electronic device (e.g., an electronic device 101 of FIG. 1, a mobile device 301 of FIG. 3, or a mobile device 1001 of FIG. 10), in operation 1201 in an active ranging round within a specific ranging block, may receive an RIM and an RFM from an initiator anchor (e.g., a first anchor 311-1 of FIG. 3 or a master anchor 1003 of FIG. 10) and may receive an RRM from at least one responder anchor (e.g., a second anchor 311-2 to an Nth anchor 311-N of FIG. 3, or a first slave anchor 1005-1 to an Nth slave anchor 1005-N of FIG. 10). In an embodiment, the RIM and the RFM received from the initiator anchor are the same as an RIM and an RFM described in reference to FIG. 4, and, as such, a detailed description thereof is omitted herein. In an embodiment, the RRM received from the at least one responder anchor is the same as an RRM described in reference to Tables 1 to 7, and, as such, a detailed description thereof is omitted herein.

In operation 1203, the electronic device may detect a location of the electronic device based on the RIM and the RFM received from the initiator anchor and the RRM received from the at least one responder anchor. A scheme in which the electronic device detects the location of the electronic device itself has been described in reference to FIGS. 5 and 6, and, as such, a detailed description thereof is omitted herein.

In operation 1205, the electronic device may select an active ranging round in which a ranging operation is to be performed in the next ranging block based on the RIM and RFM received from the initiator anchor and the RRM received from the at least one responder anchor. In an embodiment, the electronic device may select one or a plurality of active ranging rounds in which the ranging operation is to be performed in the next ranging block. In an embodiment, the electronic device may select an additional ranging round in addition to the active ranging round selected to perform the ranging operation in the next ranging block. An operation of selecting the active ranging round in which the ranging operation is to be performed in the next ranging block based on the RIM and the RFM received from the initiator anchor and the RRM received from the at least one responder anchor has been described in reference to FIGS. 10, 11A, and 11B, and, as such, a detailed description thereof is omitted herein.

Figure 13:
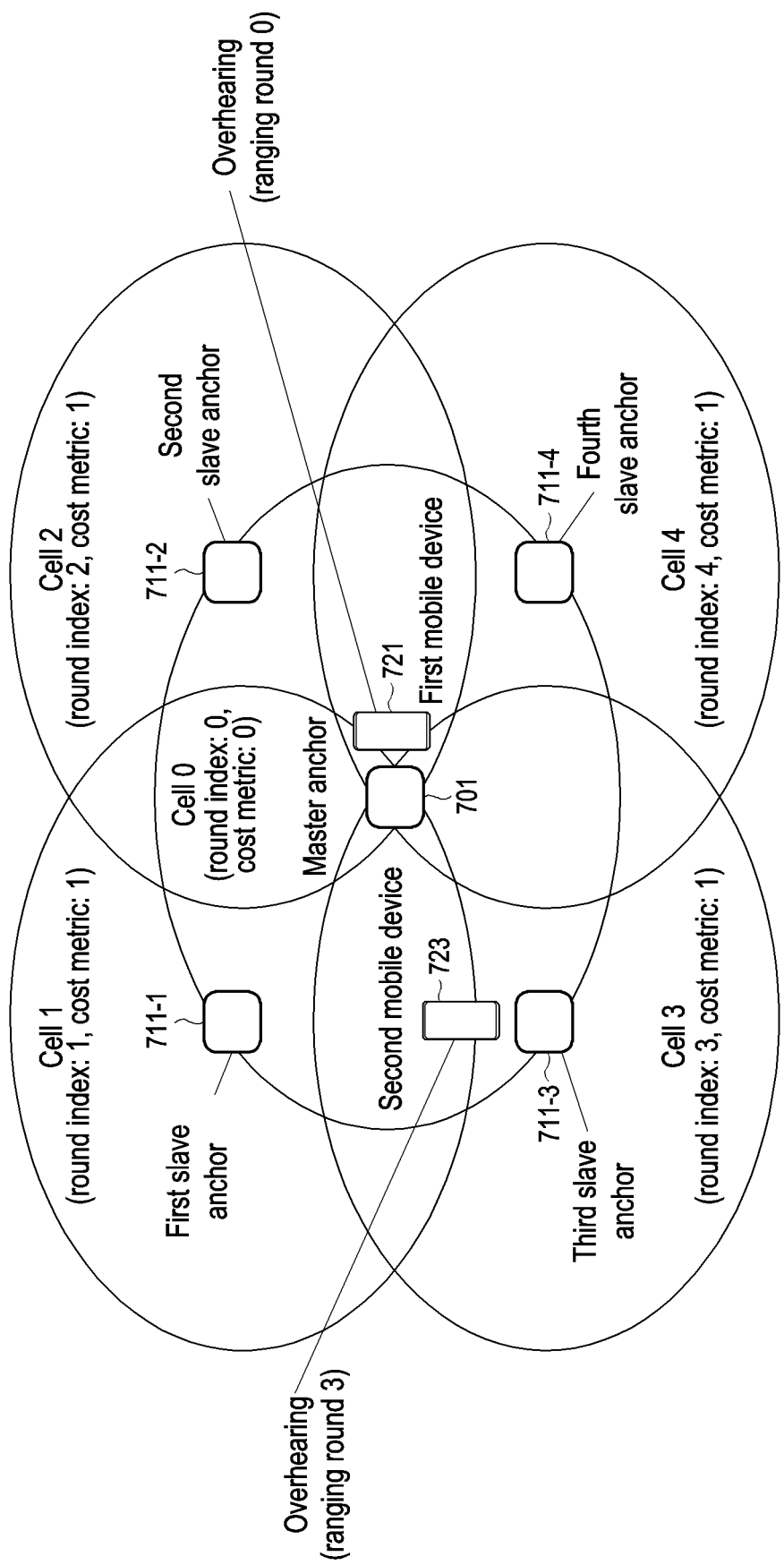
FIG. 13 is a diagram schematically illustrating still another example of an architecture of a wireless communication network according to various embodiments.

FIG. 13 is a diagram schematically illustrating still another example of an architecture of a wireless communication network according to various embodiments.

Referring to FIG. 13, it may be assumed that a wireless communication network, for example, a UWB network which is based on a UWB supports a DL TDoA scheme. A case in which a total of five cells, for example, a cell 0, a cell 1, a cell 2, a cell 3, and a cell 4 are included in the wireless communication network is illustrated in FIG. 13. In an embodiment, an anchor may exist in each cell. For example, a master anchor 701 operating as an initiator anchor in a corresponding ranging block may exist in the cell 0, a first slave anchor 711-1 operating as a responder anchor in the corresponding ranging block may exist in the cell 1, a second slave anchor 711-2 operating as a responder anchor in the corresponding ranging block may exist in the cell 2, a third slave anchor 711-3 operating as a responder anchor in the corresponding ranging block may exist in the cell 3, and a fourth slave anchor 711-4 operating as a responder anchor in the corresponding ranging block may exist in the cell 4. In an embodiment, a slave anchor may perform only a role of a responder in a corresponding cell, but may also perform a role of an initiator in another cell.

In FIG. 13, it may be assumed that time of the master anchor 701 operating as the initiator in the cell 0 is used as a time reference of the wireless communication network. In an embodiment, each cell included in the wireless network may be time synchronized with the master anchor 701 of the cell 0.

In an embodiment, a cost metric may represent the number of hops between a reference cell in which the master anchor 701 exists and an arbitrary cell. In FIG. 13, for example, a cost metric of a cell (e.g., the cell 0) in which the master anchor 701 exists may be 0, and a cost metric of each of the cell 1 to the cell 4 which are away by one hop from the cell 0 may be 1. In an embodiment, if another cell is connected to each of the cell 1 to the cell 4, a cost metric of the corresponding cell may be 2 because the other cell connected to each of the cell 1 to the cell 4 is two hops away from the cell 0.

In an embodiment, because all cells included in the wireless communication network are time synchronized with the master anchor 701, a ranging block may be simultaneously started in all cells included in the wireless communication network. In an embodiment, if a round index is set differently for each cell in the wireless communication network, all anchors included in the wireless communication network may perform a ranging operation without collision. For example, if the round index is set differently for each cell, a ranging round in which an initiator anchor transmits an RIM and an RFM is also set differently for each cell, such that all anchors included in the wireless communication network may perform the ranging operation without collision.

In FIG. 13, a location of the master anchor 701 is presented as an example for a description, and may not necessarily be limited to being located at a central point of the wireless communication network.

As described in FIG. 7, if an RRM according to an embodiment of the disclosure is not used, in a ranging block, the electronic device may perform a ranging operation in all ranging rounds for a plurality of neighbor cells as well as an active ranging round set for a serving cell by continuously performing a monitoring operation after continuously turning on a UWB RX chain. For example, if the RRM according to an embodiment of the disclosure is not used, in FIG. 7, a first electronic device 721 whose serving cell is the cell 0 may turn on the UWB RX chain and then perform a monitoring operation for all ranging rounds included in a corresponding ranging block as well as an active ranging round 0 set for the cell 0 in the corresponding ranging block, and a second electronic device 723 whose serving cell is the cell 3 may turn on the UWB RX chain and then perform a monitoring operation for all ranging rounds included in the corresponding ranging block as well as the active ranging round 0 set for the cell 3 in the corresponding ranging block. In FIG. 7, the first electronic device 721 may perform a ranging operation not only in a ranging round 0 but also in ranging rounds (e.g., a ranging round 2 and a ranging round 4) set for the cell 2 and the cell 4, and the second electronic device 723 may perform the ranging operation not only in a ranging round 3 but also in ranging rounds (e.g., a ranging round 0 and a ranging round 1) set for the cell 0 and the cell 1. That is, the first electronic device 721 and the second electronic device 723 perform a ranging operation by monitoring all ranging rounds included in a corresponding ranging block even though each of the first electronic device 721 and the second electronic device 723 detects its own location, thereby unnecessarily consuming a current.

However, as shown in FIG. 13, if an RRM according to an embodiment of the disclosure is used (e.g., if the RRM including a neighbor round index length field, a neighbor round index field, a neighbor initiator round index field, and a neighbor initiator cost metric field is used), the first electronic device 721 whose serving cell is a cell 0 performs a ranging operation only in an active ranging round 0 set for the cell 0 in a corresponding ranging block, and the second electronic device 723 whose serving cell is a cell 3 performs the ranging operation only in an active ranging round 2 set for the cell 3 in the corresponding ranging block, thereby preventing unnecessary current consumption. If the RRM according to an embodiment of the disclosure is used, each of the first electronic device 721 and the second electronic device 723 provides a seamless service when each of the first electronic device 721 and the second electronic device 723 moves or based on a state of a cell at which each of the first electronic device 721 and the second electronic device 723 is located. For example, each of the first electronic device 721 and the second electronic device 723 may select an active ranging round in which a ranging operation will be performed based on an RRM including a round index of a ranging round in which each of the first electronic device 721 and the second electronic device 723 performs the ranging operation as an initiator in a neighbor cell and the number of hops between a reference cell and the neighbor cell.

According to various embodiments of the disclosure, a method performed by an electronic device (e.g., an electronic device 101 of FIG. 1, a mobile device 301 of FIG. 3, or a mobile device 1001 of FIG. 10) may comprise receiving, from at least one external electronic device (e.g., a second anchor 311-2 to an Nth anchor 311-N of FIG. 3, or a first slave anchor 1005-1 to an Nth slave anchor 1005-N of FIG. 10) in an active ranging round within a first ranging block, a RRM including a round index of a ranging round in which the at least one external electronic device (e.g., the second anchor 311-2 to the Nth anchor 311-N of FIG. 3, or the first slave anchor 1005-1 to the Nth slave anchor 1005-N of FIG. 10) performs a ranging operation as an initiator in a neighbor cell, and a number of hops between a reference cell in which a reference external electronic device exists and the neighbor cell, and selecting an active ranging round in which the electronic device (e.g., the electronic device 101 of FIG. 1, the mobile device 301 of FIG. 3, or the mobile device 1001 of FIG. 10) will perform a ranging operation in a second ranging block based on at least the RRM.

According to various embodiments of the disclosure, the RRM may further include a round index of a ranging round in which the at least one external electronic device (e.g., the second anchor 311-2 to the Nth anchor 311-N of FIG. 3, or the first slave anchor 1005-1 to the Nth slave anchor 1005-N of FIG. 10) performs a ranging operation as a responder in at least one other neighbor cell.

According to various embodiments of the disclosure, selecting the active ranging round in which the electronic device (e.g., the electronic device 101 of FIG. 1, the mobile device 301 of FIG. 3, or the mobile device 1001 of FIG. 10) will perform the ranging operation in the second ranging block based on at least the RRM may comprise checking whether detection of a location of the electronic device (e.g., the electronic device 101 of FIG. 1, the mobile device 301 of FIG. 3, or the mobile device 1001 of FIG. 10) is successful in the active ranging round within the first ranging block, if the detection of the location of the electronic device (e.g., the electronic device 101 of FIG. 1, the mobile device 301 of FIG. 3, or the mobile device 1001 of FIG. 10) is successful, selecting a first cell which is one of a serving cell and the neighbor cell based on the RRM received from the at least one external electronic device (e.g., the second anchor 311-2 to the Nth anchor 311-N of FIG. 3, or the first slave anchor 1005-1 to the Nth slave anchor 1005-N of FIG. 10), and selecting an active ranging round in the first cell as the active ranging round in the second ranging block.

According to various embodiments of the disclosure, selecting the first cell based on the received RRM may comprise selecting the first cell based on at least one of signal quality and path quality of the received RRM, a FoV state and a LoS state of the at least one external electronic device (e.g., the second anchor 311-2 to the Nth anchor 311-N of FIG. 3, or the first slave anchor 1005-1 to the Nth slave anchor 1005-N of FIG. 10) related to the received RRM, or the number of hops between the reference cell and the neighbor cell included in the received RRM.

According to various embodiments of the disclosure, the method further comprise selecting at least one additional ranging round in which a ranging operation is to be performed in the second ranging block if a state of the first cell is a state in which a set condition is satisfied.

According to various embodiments of the disclosure, selecting the at least one additional ranging round in which the ranging operation is to be performed in the second ranging block may comprise checking whether location information of the at least one external electronic device (e.g., the second anchor 311-2 to the Nth anchor 311-N of FIG. 3, or the first slave anchor 1005-1 to the Nth slave anchor 1005-N of FIG. 10) existing in the neighbor cell or at least one other external electronic device existing on a path on which the electronic device (e.g., the electronic device 101 of FIG. 1, the mobile device 301 of FIG. 3, or the mobile device 1001 of FIG. 10) will move is obtainable, and if the location information of the at least one external electronic device (e.g., the second anchor 311-2 to the Nth anchor 311-N of FIG. 3, or the first slave anchor 1005-1 to the Nth slave anchor 1005-N of FIG. 10) or the at least one other external electronic device is obtainable, selecting the at least one additional ranging round based on the location information of the at least one external electronic device (e.g., the second anchor 311-2 to the Nth anchor 311-N of FIG. 3, or the first slave anchor 1005-1 to the Nth slave anchor 1005-N of FIG. 10) or the at least one other external electronic device.

According to various embodiments of the disclosure, the method may further comprise determining a period in which the electronic device (e.g., the electronic device 101 of FIG. 1, the mobile device 301 of FIG. 3, or the mobile device 1001 of FIG. 10) performs a ranging operation in the at least one additional ranging round based on a moving speed of the electronic device (e.g., the electronic device 101 of FIG. 1, the mobile device 301 of FIG. 3, or the mobile device 1001 of FIG. 10).

According to various embodiments of the disclosure, the method may further comprise, if the state of the first cell is a state in which the set condition is unsatisfied, selecting, as the at least one additional ranging round in which the ranging operation is to be performed in the second ranging block, a ranging round which corresponds to the round index, which is included in the RRM received from the at least one external electronic device (e.g., the second anchor 311-2 to the Nth anchor 311-N of FIG. 3, or the first slave anchor 1005-1 to the Nth slave anchor 1005-N of FIG. 10), of the ranging round in which the at least one external electronic device (e.g., the second anchor 311-2 to the Nth anchor 311-N of FIG. 3, or the first slave anchor 1005-1 to the Nth slave anchor 1005-N of FIG. 10) performs the ranging operation as the responder in the at least one other neighbor cell.

According to various embodiments of the disclosure, a method performed by an electronic device (e.g., a second anchor 311-2 to an Nth anchor 311-N of FIG. 3, or a first slave anchor 1005-1 to an Nth slave anchor 1005-N of FIG. 10) may comprise generating a RRM including a neighbor initiator round index field indicating a round index of a ranging round in which the electronic device (e.g., the second anchor 311-2 to the Nth anchor 311-N of FIG. 3, or the first slave anchor 1005-1 to the Nth slave anchor 1005-N of FIG. 10) performs a ranging operation as an initiator in a neighbor cell, and a neighbor initiator cost metric field indicating a number of hops between a reference cell in which a reference external electronic device exists and the neighbor cell, and transmitting the RRM in at least one ranging round within a first ranging block.

According to various embodiments of the disclosure, the RRM may further include a neighbor round index field indicating a round index of a ranging round in which the electronic device (e.g., the second anchor 311-2 to the Nth anchor 311-N of FIG. 3, or the first slave anchor 1005-1 to the Nth slave anchor 1005-N of FIG. 10) performs a ranging operation as a responder in at least one other neighbor cell.

According to various embodiments of the disclosure, the RRM may further include a neighbor round index length field indicating a length of the neighbor round index field.

According to various embodiments of the disclosure, the RRM may further include a neighbor initiator round index preset field indicating whether the neighbor initiator round index field is present, a neighbor initiator round index present field indicating whether the neighbor round index field is present, and/or a neighbor initiator cost metric present field indicating whether the neighbor initiator cost metric field is present.

Various embodiments of the disclosure may provide an electronic device for performing a ranging operation and an operating method thereof.

Various embodiments of the disclosure may provide an electronic device for selecting an active ranging round and an operating method thereof.

Various embodiments of the disclosure may provide an electronic device for selecting an additional ranging round together with an active ranging round, and an operating method thereof.

What is claimed is:

1. An electronic device comprising:
   a communication circuit; and
   at least one processor operatively connected to the communication circuit, wherein the at least one processor is configured to:
      receive, via the communication circuit from at least one external electronic device in a first active ranging round within a first ranging block, a ranging response message (RRM) including a first round index of a first ranging round in which the at least one external electronic device performs a first ranging operation as an initiator in a neighbor cell, and a number of hops between a reference cell in which a reference external electronic device exists and the neighbor cell, and
      select a second active ranging round in which the electronic device performs a second ranging operation in a second ranging block based on at least the RRM.

2. The electronic device of claim 1, wherein the RRM further includes a third round index of a third ranging round in which the at least one external electronic device performs a third ranging operation as a responder in at least one other neighbor cell.

3. The electronic device of claim 2, wherein the at least one processor is configured to:
   check whether detection of a location of the electronic device is successful in the first active ranging round within the first ranging block,
   based on the detection of the location of the electronic device being successful, select a first cell which is one of a serving cell and the neighbor cell based on the RRM, and
   select a third active ranging round in the first cell as the second active ranging round in the second ranging block.

4. The electronic device of claim 3, wherein the at least one processor is configured to select the first cell based on at least one of signal quality and path quality of the RRM, a field of view (FoV) state and a line of sight (LoS) state of the at least one external electronic device related to the RRM, or the number of hops between the reference cell and the neighbor cell included in the RRM.

5. The electronic device of claim 3, wherein the at least one processor is further configured to select at least one additional ranging round in which a fourth ranging operation is to be performed in the second ranging block based on a state of the first cell being a state in which a set condition is satisfied.

6. The electronic device of claim 5, wherein the at least one processor is configured to:
   check whether location information of the at least one external electronic device existing in the neighbor cell or at least one other external electronic device existing on a path on which the electronic device moves is obtainable, and
   based on the location information of the at least one external electronic device or the at least one other external electronic device being obtainable, select the at least one additional ranging round based on the location information of the at least one external electronic device or the at least one other external electronic device.

7. The electronic device of claim 5, wherein the at least one processor is further configured to determine a period in which the electronic device performs the fourth ranging operation in the at least one additional ranging round based on a moving speed of the electronic device.

8. The electronic device of claim 5, wherein the at least one processor is further configured to:
   based on the state of the first cell is a state in which the set condition being unsatisfied, select, as the at least one additional ranging round in which the fourth ranging operation is to be performed in the second ranging block, a ranging round which corresponds to the third round index, which is included in the RRM received from the at least one external electronic device, of the third ranging round in which the at least one external electronic device performs the third ranging operation as the responder in the at least one other neighbor cell.

9. An electronic device comprising:
   a communication circuit; and
   at least one processor operatively connected to the communication circuit, wherein the at least one processor is configured to:
      generate a ranging response message (RRM) including a neighbor initiator round index field indicating a first round index of a first ranging round in which the electronic device performs a first ranging operation as an initiator in a neighbor cell, and a neighbor initiator cost metric field indicating a number of hops between a reference cell in which a reference external electronic device exists and the neighbor cell, and
      transmit, via the communication circuit, the RRM in at least one second ranging round within a first ranging block.

10. The electronic device of claim 9, wherein the RRM further includes a neighbor round index field indicating a third round index of a third ranging round in which the electronic device performs a second ranging operation as a responder in at least one other neighbor cell.

11. The electronic device of claim 10, wherein the RRM further includes a neighbor round index length field indicating a length of the neighbor round index field.

12. The electronic device of claim 10, wherein the RRM further includes at least one of a neighbor initiator round index preset field indicating whether the neighbor initiator round index field is present, a neighbor initiator round index present field indicating whether the neighbor round index field is present, and a neighbor initiator cost metric present field indicating whether the neighbor initiator cost metric field is present.

13. A method performed by an electronic device, the method comprising:
   receiving, from at least one external electronic device in a first active ranging round within a first ranging block, a ranging response message (RRM) including a first round index of a first ranging round in which the at least one external electronic device performs a first ranging operation as an initiator in a neighbor cell, and a number of hops between a reference cell in which a reference external electronic device exists and the neighbor cell; and
   selecting a second active ranging round in which the electronic device performs a second ranging operation in a second ranging block at least based on the RRM.

14. The method of claim 13, wherein the RRM further includes a third round index of a third ranging round in which the at least one external electronic device performs a third ranging operation as a responder in at least one other neighbor cell.

15. The method of claim 14, wherein the selecting the second active ranging round comprises:
- checking whether detection of a location of the electronic device is successful in the first active ranging round within the first ranging block;
- based on the detection of the location of the electronic device being successful, selecting a first cell which is one of a serving cell and the neighbor cell based on the RRM; and
- selecting a third active ranging round in the first cell as the second active ranging round in the second ranging block.

16. The method of claim 15, wherein the selecting the first cell based on the RRM comprises:
- selecting the first cell based on at least one of signal quality and path quality of the RRM, a field of view (FoV) state and a line of sight (LoS) state of the at least one external electronic device related to the RRM, and the number of hops between the reference cell and the neighbor cell included in the RRM.

17. The method of claim 15, further comprising:
- selecting at least one additional ranging round in which a fourth ranging operation is to be performed in the second ranging block based on a state of the first cell being a state in which a set condition is satisfied.

18. The method of claim 17, wherein the selecting the at least one additional ranging round comprises:
- checking whether location information of the at least one external electronic device existing in the neighbor cell or at least one other external electronic device existing on a path on which the electronic device moves is obtainable; and
- based on the location information of the at least one external electronic device or the at least one other external electronic device being obtainable, selecting the at least one additional ranging round based on the location information of the at least one external electronic device or the at least one other external electronic device.

19. The method of claim 17, further comprising:
- determining a period in which the electronic device performs the fourth ranging operation in the at least one additional ranging round based on a moving speed of the electronic device.

20. The method of claim 17, further comprising:
- based on the state of the first cell is a state in which the set condition being unsatisfied, selecting, as the at least one additional ranging round in which the fourth ranging operation is to be performed in the second ranging block, a ranging round which corresponds to the third round index, which is included in the RRM received from the at least one external electronic device, of the third ranging round in which the at least one external electronic device performs the third ranging operation as the responder in the at least one other neighbor cell.

* * * * *